(12) United States Patent
Bourelle

(10) Patent No.: US 6,873,777 B2
(45) Date of Patent: Mar. 29, 2005

(54) TWO-DIMENSIONAL PHOTONIC CRYSTAL DEVICE

(75) Inventor: Emmanuel Bourelle, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/794,256

(22) Filed: Mar. 5, 2004

(65) Prior Publication Data

US 2004/0179803 A1 Sep. 16, 2004

(30) Foreign Application Priority Data

Mar. 10, 2003 (JP) .......................................... 2003-063029

(51) Int. Cl.⁷ ............................. G02B 6/10; G02B 6/26; G02B 6/42
(52) U.S. Cl. .......................................... 385/129; 385/31
(58) Field of Search ................................... 385/31, 129

(56) References Cited

U.S. PATENT DOCUMENTS 6,310,991 B1 * 10/2001 Koops et al. .................. 385/14
2003/0174993 A1 * 9/2003 Tomaru ....................... 385/129

FOREIGN PATENT DOCUMENTS

JP 01272555 10/2001

OTHER PUBLICATIONS

Patrini et al., "Photonic Bands in Petterned Silicon–on–Insulator Waveguides," Jul. 2002, IEEE Journal of Quantum Electronics, vol. 38, No. 7.*

Chongjun, J., et al.,, "Demultiplexer using directly resonant tunneling between point defects and waveguides in a photonic crystal", Journal of Applied Physics, vol. 91, No. 7, Apr. 2002, pp. 4771–4773.

Fan, S., et al., "Channel drop filters in photonic crystals," Optics Express 4, vol. 3, No. 1, Jul. 1998, pp. 4–11.

* cited by examiner

Primary Examiner—Frank G. Font
Assistant Examiner—Joanne H. Kim
(74) Attorney, Agent, or Firm—David N. Lathrop, Esq.; Gallagher & Lathrop

(57) ABSTRACT

Columnar pillars are arranged in a square lattice pattern to form a two-dimensional photonic crystal. The two-dimensional photonic crystal has crystal defects created by the absence of pillars, and a resonator is formed in a line waveguide provided by the crystal defects. The resonator is made up of a main pillar, a pair of sub-pillars disposed at the light incidence side of the waveguide with respect to the main pillar and another pair of sub-pillars at the light emitting side of the waveguide with respect to the main pillar, the main pillar and sub-pillars being disposed in the waveguide. The main pillar and the sub-pillars are formed of the same medium as that of the pillars, and are formed simultaneously with the pillars by patterning a silicon thin film coated all over a silicon substrate through a $SiO_2$ film formed over the entire surface thereof. Light of a particular wavelength in wavelength-multiplexed incident light is transmitted through the resonator.

8 Claims, 24 Drawing Sheets

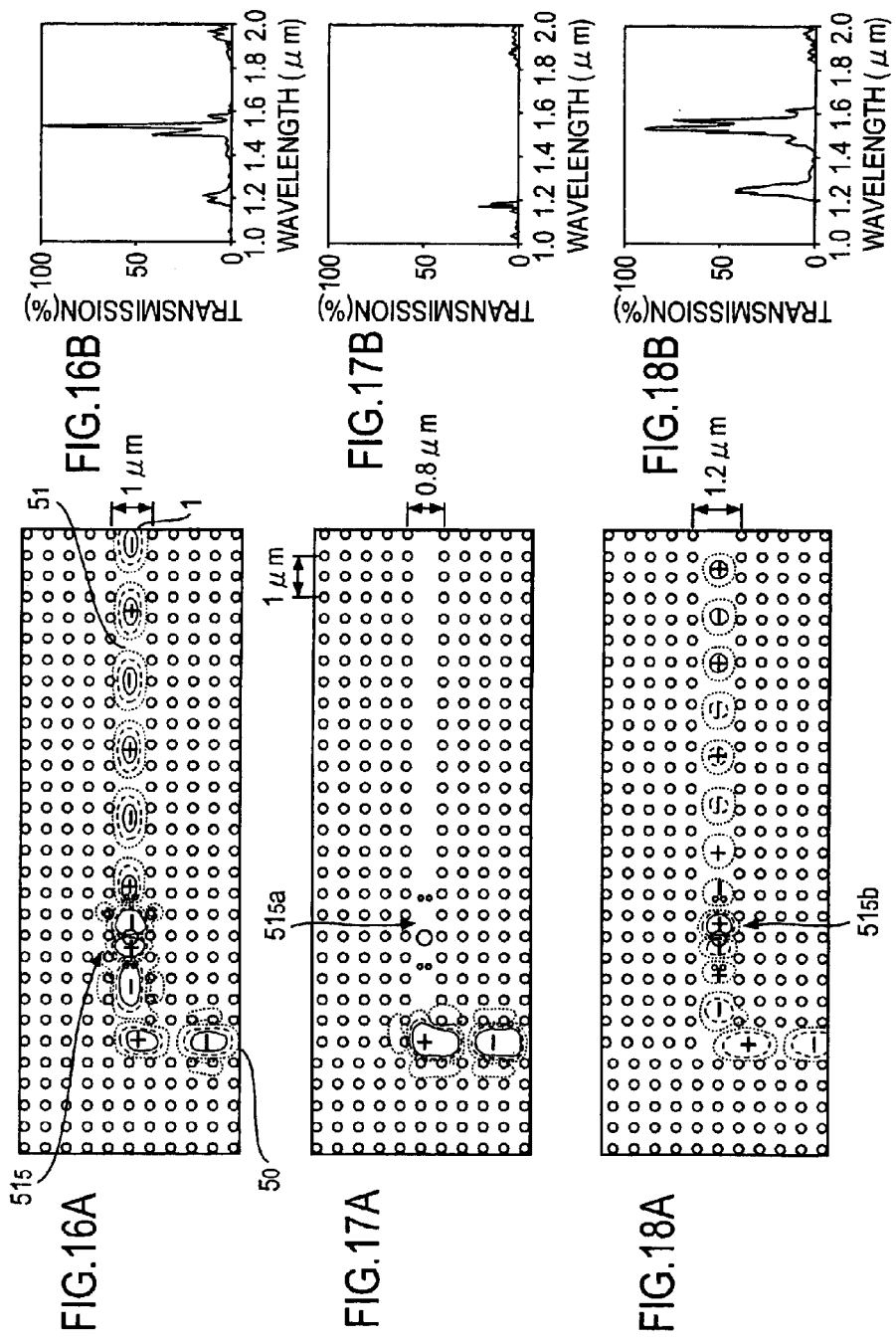

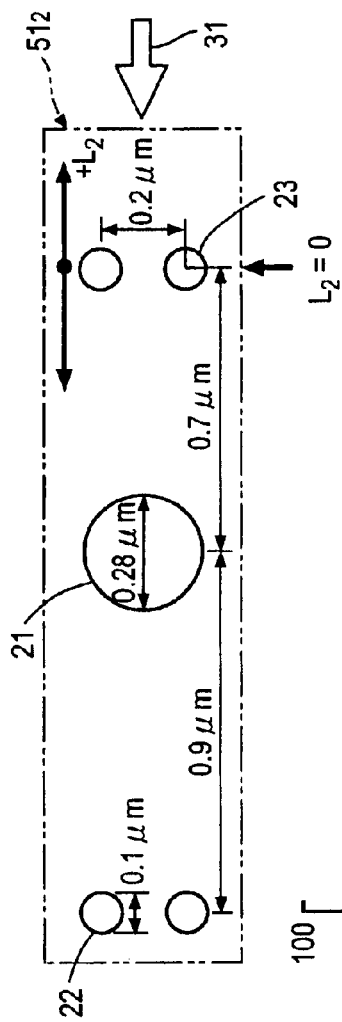
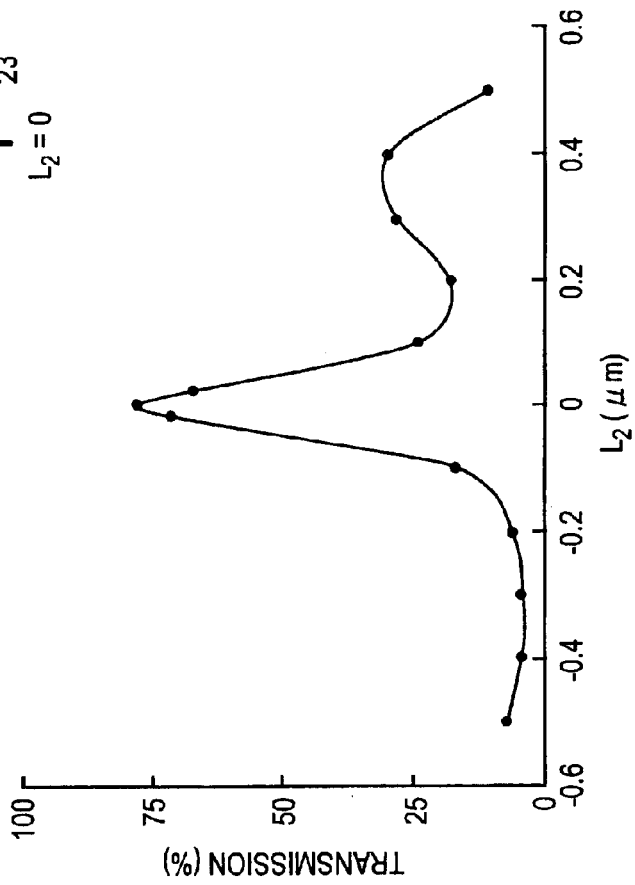
FIG.20A
FIG.20B

TWO-DIMENSIONAL PHOTONIC CRYSTAL DEVICE

BACKGROUND OF THE INVENTION

The present invention relates to a two-dimensional photonic crystal device and, more particularly, to a two-dimensional photonic crystal device for use in WDM (Wavelength Division Multiplex) communications and in similar technical fields.

Over the past few years, spectacular technological advances have been made in the field of optical wavelength division multiplexing (hereinafter referred to as WDM) communications. These technological progresses aim to meet the demands by network users for higher communication speeds in the Internet. The WDM technology is now going mainstream in the construction of optical communication networks although the use of expensive WDM components inevitably raises the overall cost of optical communication systems in the Internet. Nowadays, optics is used in various fields of transmission of information through optical communication networks. The next generation optics is expected as technologies that implement some or all of switching and control operations in such optical networks. The new optics technologies will lead to realization of low-cost, high-performance WDM components.

Incidentally, the WDM technology is based on a variety of conventional technologies, such as Fabry-Perot filter, thin film interference filters, Mach-Zehnder filters, birefringent filters, fiber-gating Bragg reflection Filters and waveguide diffraction gratings. On the other hand, a low-loss, bend waveguide in optical ICs needs to be gently bent over as long a distance as hundreds of μm—this inevitably makes the optical ICs bulky.

A multi-channel WDM device smaller in size than conventional devices can be obtained through utilization of photonic crystal technologies. The photonic crystals are artificial periodic structures with two kinds of transparent media of greatly different refractive indexes alternately arranged at regular intervals of the order of half-wavelength of light. With photonic crystals, it is possible to fabricate a one-piece, high-density compound device that is handled on the scale of the order of sub-millimeters and bends light in a predetermined direction and hence exhibits multiple optical functions.

Such photonic crystals fall roughly into a one-dimensional photonic crystal formed by a one-dimensional periodic alternation of media of refractive indexes $n_1$ and $n_2$, a two-dimensional photonic crystal formed by a two-dimensional periodic alternation of media of refractive indexes $n_1$ and $n_2$, and a three-dimensional photonic crystal formed by a three-dimensional periodic alternation of media of refractive indexes $n_1$ and $n_2$. Such photonic crystals use silicon (Si), gallium arsenide (GaAs), indium phosphide (InP) or similar semiconductor as the medium of the refractive index $n_1$ which is, for instance, the higher refractive index, and air or glass as the medium of the low refractive index $n_2$.

The photonic crystals have a periodic structure with the elements arranged at intervals of the order of half-wavelength of light as described above. For example, when the photonic crystal of the two-dimensional periodic structure uses air as the medium of the low refractive index and a dielectric as the medium of the high refractive index, the elements of the periodic structure may be dielectric pillars arranged in the air or cavities arranged in the dielectric. One of unique features of the photonic crystal is a photonic band gap, which is a frequency range in which light of a certain range of wavelengths is prevented from propagation. The photonic crystal can be used for control of light since an optical waveguide can be formed in the crystal by introducing thereinto crystal defects. The waveguide in the photonic crystal is provided by an omission of one line of elements of the periodic structure.

In Japanese Patent Application Kokai Publication No. 2001-272555 gazette (published Oct. 5, 2001, hereinafter referred to as document 1) there is set forth an add-drop filter of the type having crystal defects formed along the waveguide. FIG. 1 depicts the add-drop filter described in document 1, which has a two-dimensional photonic crystal structure in which a slab 11, formed of a material higher in refractive index than air, has columnar holes 16 perforated therein in a triangular lattice pattern to form a refractive index distribution. In the periodic structure of the photonic crystal there is provided crystal defects which form a line waveguide 12, and the diameter of one of cavities adjacent the waveguide is changed to form a point defect 14 which disturbs the periodic arrangement of elements of the photonic crystal. Of light 13 in the wavelength range including a plurality of wavelengths ($\lambda 1, \lambda 2, \ldots \lambda i, \ldots$) that are launched into the waveguide for propagation therethrough, light 15 of a particular wavelength ($\lambda i$) is captured by the point defect 14 and emitted in a direction perpendicular to the top surface of the slab 11.

In C. Jin, S. Han, X. Meng, B. Cheng, and D. Zhang, "Demultiplexer using directly resonant tunneling between point defects and waveguides in a photonic crystal," J. Appl. Phys., Vol. 91, No. 7, P. 4771–4773, 1 Apr. 2002 (hereinafter referred to as document 2) there is set forth such a two-dimensional photonic crystal device as shown in FIG. 2A. In FIG. 2A, in the periodic structure of the two-dimensional photonic crystal, point defects C1, C2, C3 and C4 are formed by pillars different in diameter from pillars 71 of the periodic structure and of different refractive indexes are provided. A line waveguide 73, which is formed by an omission of some lines of the pillars 71, extends from one side 72 of the two-dimensional photonic crystal structure to the other side 74 thereof. The waveguide 73 is branched into four waveguides one after another which extend to the other side 74 passing by the point defects C1, C2, C3 and C4, respectively. And the pillars 71 of the periodic structure are located in pairs at the front and rear of each of the point defects C1, C2, C3 and C4 in the lengthwise direction of the respective waveguide. Light of a wide band launched into the waveguide 73 from the one side 72 is transmitted through the point defects C1, C2, C3 and C4 acting as resonators, as shown in FIG. 2B.

In S. Fan, P. R. Villeneuve, J. D. Joannopoulos, and H. A. Haus, "Channel drop filters in photonic crystals," Opt. Express, Vol. 3, No 1, P. 4–11, 6 Jul. 1998 (hereinafter referred to as document 3), too, there is set forth such a two-dimensional photonic crystal device as shown in FIG. 3. In the two-dimensional photoic crystal structure, two line waveguides 81 and 82 are provided, and in the periodic structure defined by the two waveguides 81 and 82 a point defect 84 is provided which differs in diameter and in refractive index from pillars 83 of the periodic structure. The point defect 84 is used as a resonator. Of wavelength multiplexed light that propagates through the waveguide 81, for instance, light of a particular wavelength alone is separate by the point defect 84 for propagation through the waveguide 82.

Conventionally, as described above, the two-dimensional photonic crystal device as a wavelength selective filter has a structure in which a line waveguide is formed by crystal defects in the photonic crystal structure and a point defect as a resonator is formed adjacent the waveguide in the periodic structure of the photonic crystal.

However, in the two-dimensional photonic crystal device of document 1, for example, when the wavelength of light to be propagated is 1.55 µm, the thickness of the wall of the slab 11 between the cavities 16 of the periodic structure and the cavity forming the point defect 14 is as thin as around 0.06 µm; therefore, it is difficult to fabricate the device of document 1. In the devices of documents 2 and 3, it is necessary that a pillar different in refractive index from the pillars of the periodic structure of the two-dimensional photonic crystal be formed as a point defect in the periodic structure, but changing the refractive index is not easy from the viewpoint of fabrication. In particular, the device of document 2, which has four point defects and four channels, requires, in addition to two media forming the photonic crystal, four media different in refractive index from them, hence the device is extremely difficult to fabricate.

SUMMARY OF THE INVENTION

It is therefore an object of the present invention to provide an easy-to-fabricate two-dimensional photonic crystal device that can be used as an excellent wavelength selective filter.

According to the present invention, there is provide a two-dimensional photonic crystal device which comprises: a two-dimensional photonic crystal composed of a first medium layer having a first refractive index and pillars of a second medium having a refractive index different from that of said first medium layer and disposed therein in a square lattice pattern: a line waveguide formed in said two-dimensional photonic crystal by its crystal defects; and resonant pillars of said second medium disposed in said line waveguide.

The resonant pillars are formed of the same medium as that of pillars forming a periodic structure of the two-dimensional photonic crystal, and hence it can be constructed from only two kinds of media of different refractive indexes—this allows much ease in the fabrication of the two-dimensional photonic crystal according to the present invention.

BRIEF DESCRIPTION OF THE DRAWINGS

FIG. 16A is a plan view showing a one-channel two-dimensional photonic crystal device having a resonator with the main pillar 21 and two pairs of sub-pillars 22 and 23 disposed in a waveguide and the electric field distribution formed on the device;

FIG. 16B is a graph showing the wavelength-transmission characteristics of the FIG. 16A device;

FIG. 17A is a plan view showing the structure of a modified form of the FIG. 16A device and the electric field distribution formed therein;

FIG. 17B is a graph showing the wavelength-transmission characteristics of the resonator in the FIG. 17A device;

FIG. 18A is a plan view showing the structure of a modified form of the FIG. 16A device and the electric field distribution formed therein;

FIG. 18B is a graph showing the wavelength-transmission characteristics of the resonator in the FIG. 18A device;

FIG. 20A is a diagram showing the direction in which to shift the positions of the sub-pillars 23 in the resonator $51_2$ depicted in FIG. 19A;

FIG. 20B is a graph showing variations in the transmittance of the resonator $51_2$ with the positions of the sub-pillars 23 shifted as depicted in FIG. 20A;

DETAILED DESCRIPTION OF THE PREFERRED EMBODIMENTS

Figure 1:
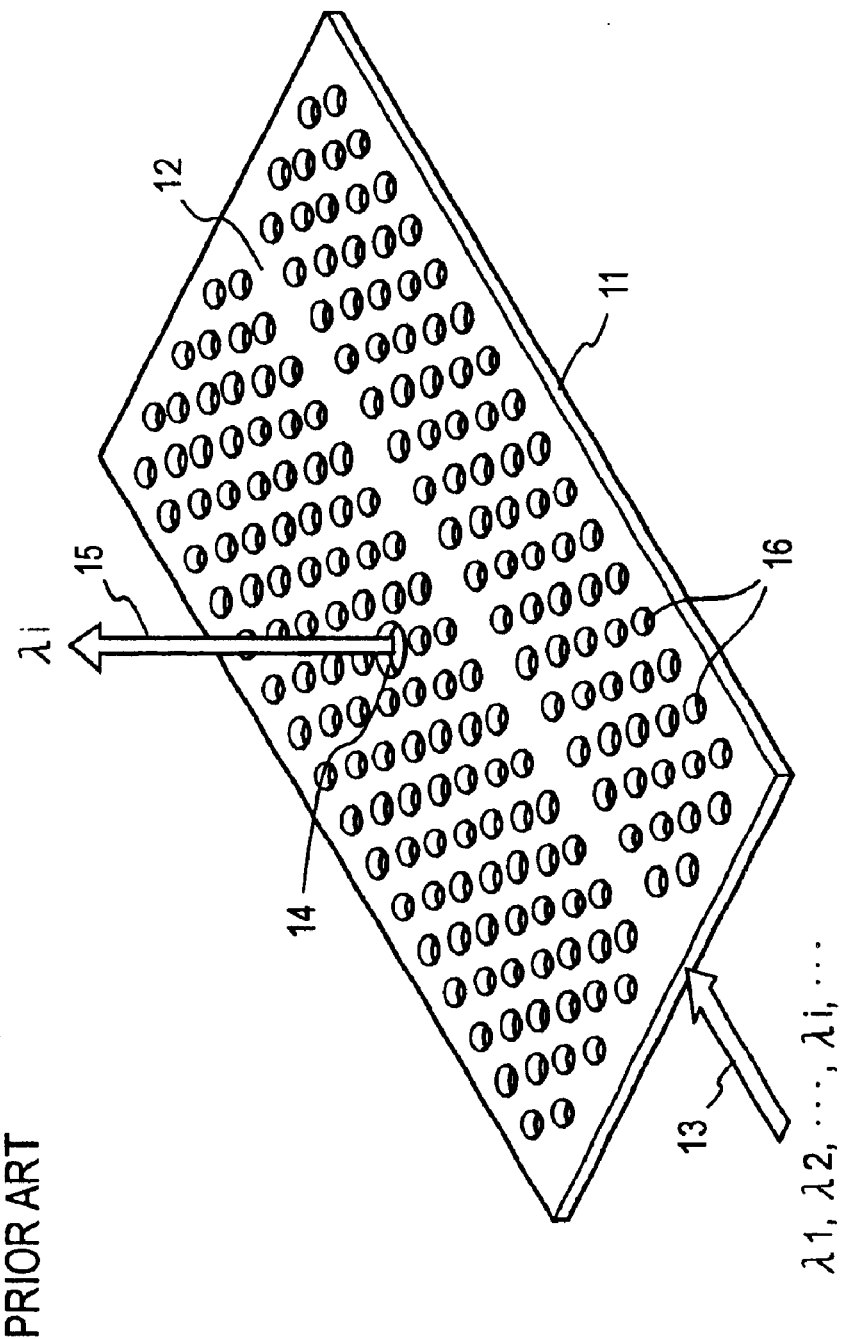
FIG. 1 is a perspective view showing a first prior art example of a two-dimensional photonic crystal device.
Figure 2A:
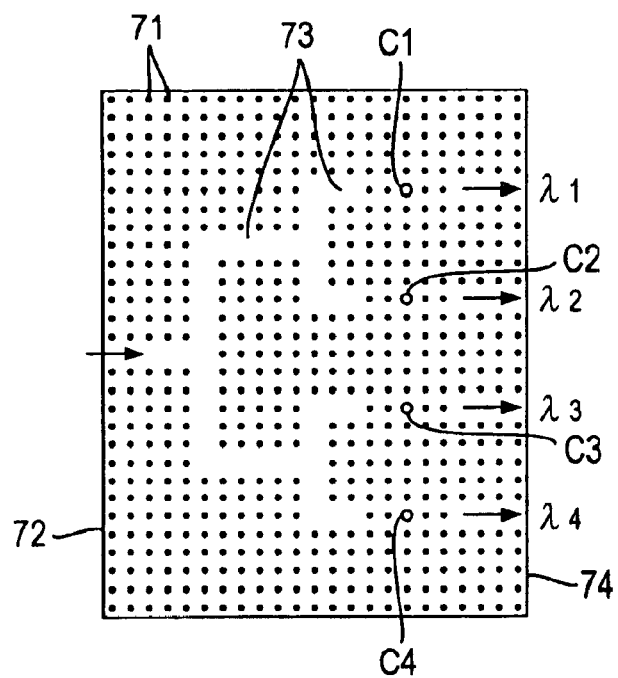
FIG. 2A is a pan view showing a second prior art example of a two-dimensional photonic crystal device.
Figure 2B:
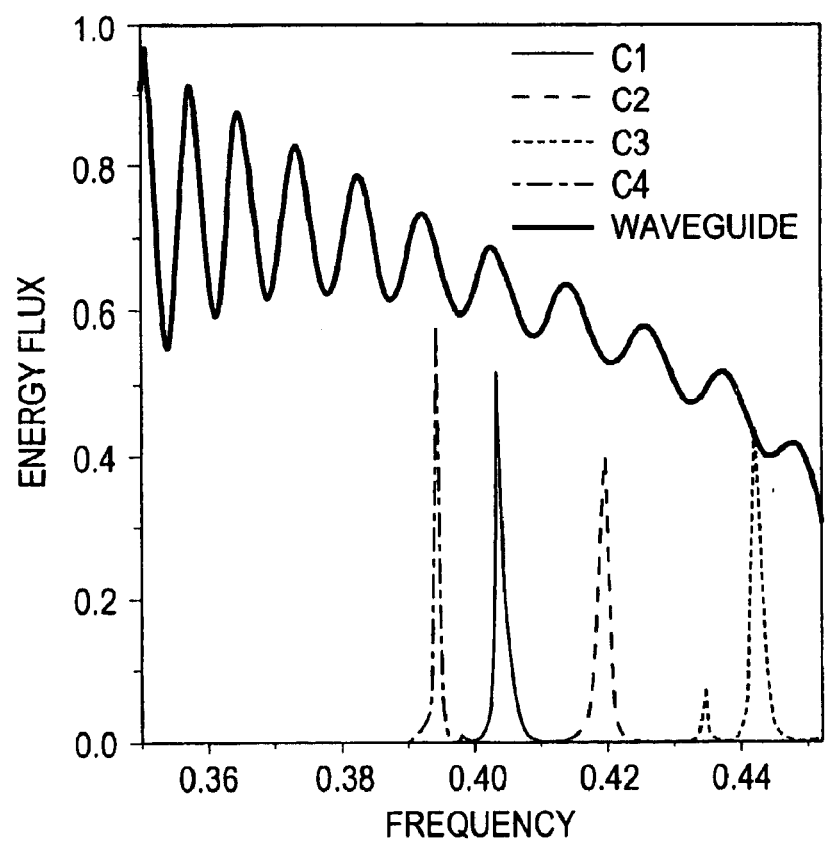
FIG. 2B is a graph showing frequency characteristics of light demultiplexed by the device of FIG. 2A.
Figure 3:
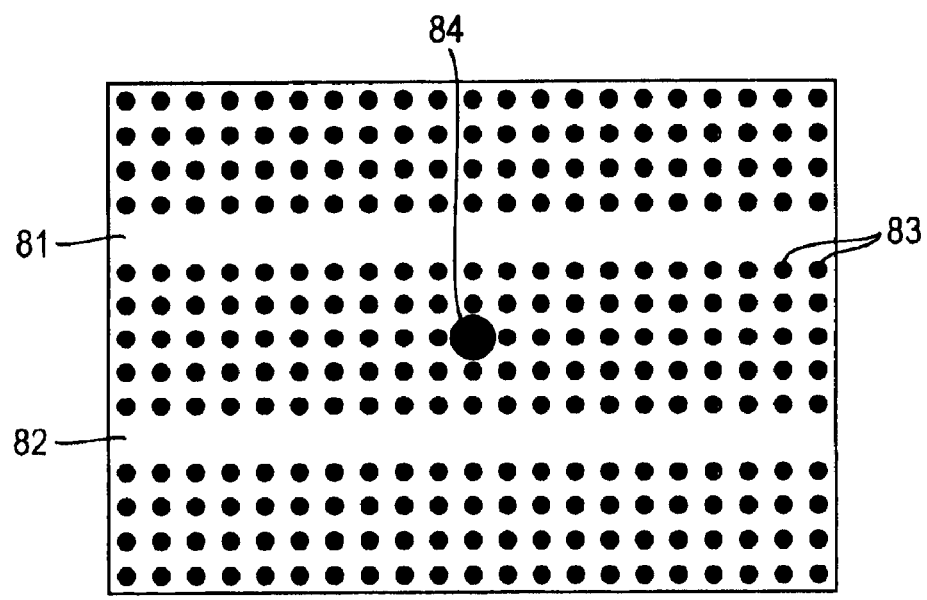
FIG. 3 is a plan view showing a third prior art example of the two-dimensional photonic crystal device.

Embodiments of the present invention will be described below with reference to the accompanying drawings.

Embodiment 1

A description will be given first, with reference to FIGS. 4A and 4B, of the basic structure of a two-dimensional photonic crystal device according to this embodiment. The two-dimensional photonic crystal device of this embodiment is fabricated by forming a $SiO_2$ film 61 over the entire surface of a silicon substrate 6 and patterning a silicon thin film coated all over the $SiO_2$ film 61 by means of lithography and etching to form columnar pillars 62.

The columnar pillars 62 formed of silicon are arranged in rows and columns at equal intervals, that is, in a square lattice pattern; a periodic structure of the silicon (with a refractive index of 3.4) pillars 62 arranged in air (with a refractive index of 1.0) constitutes a two-dimensional photonic crystal. The two-dimensional photonic crystal has crystal defects created by the absence of one line of silicon pillars 62; the crystal defects constitute a line waveguide 5, in which there is formed a resonator 51.

The resonator 51 is formed, in this example, by five silicon pillars for resonance disposed on the line waveguide 5. The five pillars are a main pillar 21 positioned at the center of the waveguide 5, and a pair of sub-pillars 23 and another pair of sub-pillars 22 positioned at the light-incident side and the light-emitting side of the waveguide 5 with respect to the main pillar 21, respectively.

The paired sub-pillars 22 and 23 are disposed side by side in a direction perpendicular to the lengthwise direction of the waveguide 5, that is, in the widthwise direction thereof, and the two sub-pillars 22 and the two sub-pillars 23 are respectively arranged symmetrically in respect of the center of the waveguide 5 in its widthwise direction. The main pillar 21 is located at the center of the waveguide 5 widthwise thereof. The arrows 31 in FIGS. 4A and 4B indicate the direction of propagation of light through the waveguide 5. The main pillar 21 and the sub-pillars 22 and 23 are formed together with the pillars 62. Incidentally, FIG. 4A is a schematic showing of the two-dimensional photonic crystal structure, in which the pillars 62, the main pillar 21 and the sub-pillars 22 and 23 are depicted with their heights greatly scaled down.

In this embodiment, as described above, the two-dimensional photonic crystal has a structure in which a first medium layer of a first refractive index is formed by air, a second medium of a second refractive index different from that of the air is formed of silicon and the silicon pillars 62 are buried in air.

The two-dimensional photonic crystal structure has a photonic band gap, within which no in-plane propagation of light is allowed over a certain range of wavelengths. On the other hand, the line waveguide 5 permits propagation therethrough of light over a relatively wide range of wavelengths, including those in the photonic band gap as well; and light of wavelengths allowed to propagate in the band gap propagates through the waveguide 5; the resonator 51 placed in the waveguide 5 transmits light of a particular wavelength alone which resonates therewith. Accordingly, the two-dimensional photonic crystal device of this embodiment functions as a wavelength selective filter. The main pillar 21 selectively transmits light of a specific wavelength, and the sub-pillars 22 and 23 serve to control the sharpness of the peak of the transmittance profile of the transmitted light and hence enhance its Q-factor. This will be described below in detail.

Figure 5:
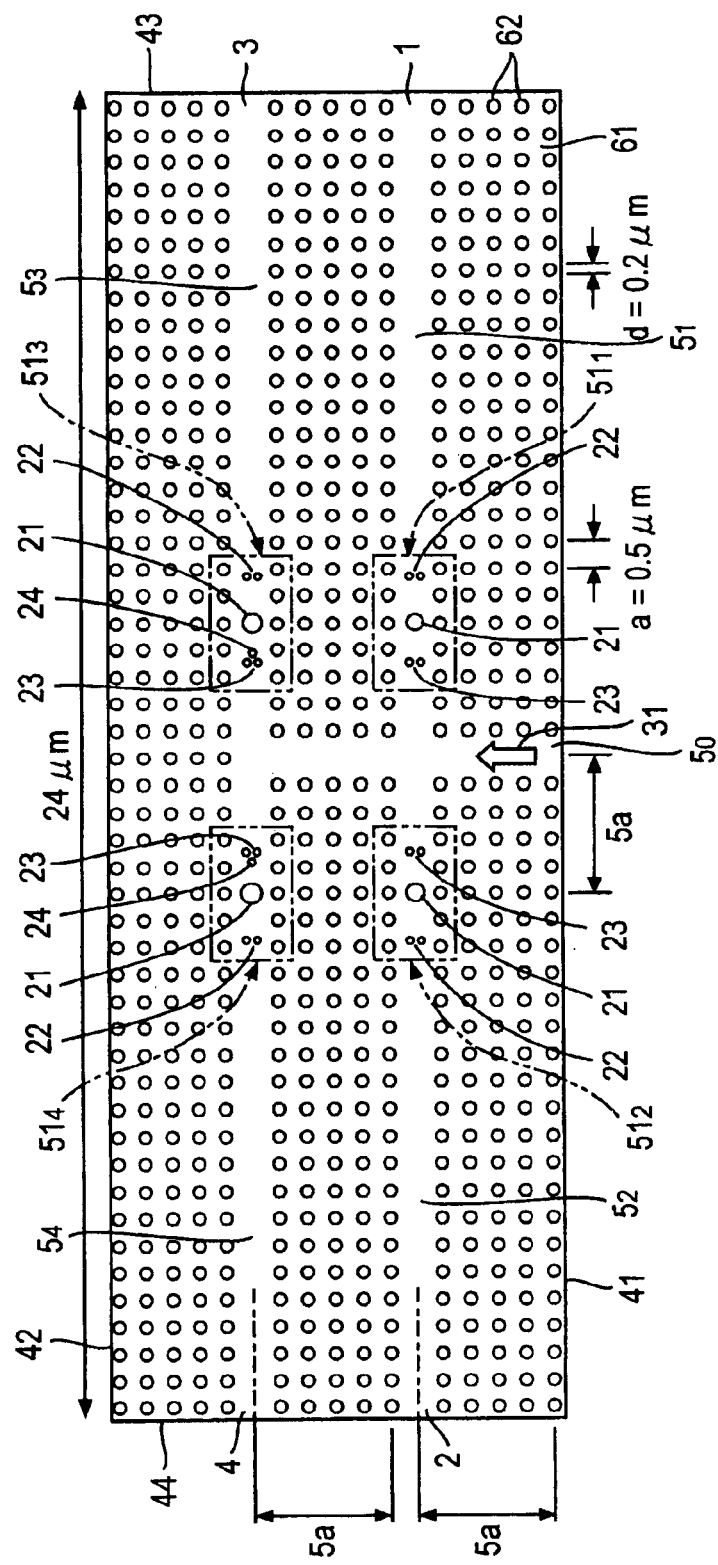
FIG. 5 is a plan view illustrating a concrete structure of the first embodiment of the present invention.

Next, a description will be given of a concrete configuration of the two-dimensional photonic crystal device. FIG. 5 illustrates the configuration of a two-dimensional WDM photonic crystal device that can be used to demultiplex wavelength-multiplexed light into light of the original individual wavelengths. In a periodic structure of silicon pillars 62 arranged in a square lattice pattern, there are formed five waveguides $5_0$, $5_1$, $5_2$, $5_3$, and $5_4$, each provided by intentional omission of one line of pillars 62.

The periodic structure of the pillars 62 has a photonic band gap for light of a wavelength in the range of from 1.15 to 1.80 μm; the pillars 62 each have a diameter d of 0.2 μm, and the lattice spacing a is 0.5 μm. The height of each pillar 62 is determined according to the spot diameter of incident light; for example, it is set to about 10 μm.

The waveguide $5_0$ is an inlet wavelength into which multiplexed light is launched, and is located at the center of the two-dimensional photonic crystal device in its lengthwise direction. The waveguide $5_0$ is formed by the blank space corresponding to one line of 12 pillars 62 in the direction from the one long side 41 toward the other long side 42 of the device structure rectangular in plan configuration. The waveguides $5_3$ and $5_4$ extend in opposite directions from the inner end of the waveguide $5_0$ to both short sides 43 and 44 of the rectangular device structure perpendicularly to the waveguide $5_0$. The waveguides $5_1$ and $5_2$ extend in opposite directions from the intermediate portion of the waveguide $5_0$ to the both short sides 43 and 44 at right angles thereto. Incidentally, the waveguides $5_1$ and $5_2$ are each formed by the blank space corresponding to one line of pillars 62 which are spaced five times the lattice spacing a away from the outermost pillars 62 arranged along the long side 41 of the device structure, and the waveguides $5_3$ and $5_4$ are each similarly formed by the blank space corresponding to one line of pillars 62 spaced five times the lattice spacing a away from the corresponding one of the waveguides $5_1$ and $5_2$.

In the waveguides $5_1$, $5_2$, $5_3$ and $5_4$ there are provided resonators $51_1$, $51_2$, $51_3$ and $51_4$, respectively, through which light of different particular wavelengths is transmitted, and the transmitted light of the particular wavelengths is emitted from the waveguides $5_1$, $5_2$, $5_3$ and $5_4$, respectively. Accordingly, in this embodiment the waveguides $5_1$, $5_2$, $5_3$ and $5_4$ constitute four channels (output channels) 1, 2, 3 and 4.

The configurations of the resonators $51_1$, $51_2$, $51_3$ and $51_4$ of channels 1 to 4 and their light transmission characteristics were simulated using software "FullWave" of Rsoft, Inc. This software is based on a FDTD (Finite Difference Time Domain) method.

In the simulations the diameters of the main pillars 21 of the resonators $51_1$, $51_2$, $51_3$ and $51_4$ were determined first, and the numbers, diameters and positions of the sub-pillars 22 and 23 were so optimized as to achieve a high transmittance and obtain transmitted light of a sharp transmittance profile and a high Q-factor.

FIGS. 6A to 6D show the configurations of the resonators $51_1$, $51_2$, $51_3$ and $51_4$ of channels 1 to 4 obtained by simulations, the pillars 62 at both sides of each waveguide being omitted in the interests of brevity. FIG. 7 is a graph showing the relationships between the wavelengths and transmittance of light in channels 1 to 4 transmitted through the resonators $51_1$, $51_2$, $51_3$ and $51_4$, respectively. The numerals 1, 2, 3 and 4 applied to the waveforms represent the channel numbers.

A description will be made first of the configurations of the resonators $51_1$, $51_2$, $51_3$ and $51_4$. Incidentally, in FIGS. 6A to 6D light is shown to be incident from the left-hand side of the drawings as indicated by the arrows. The diameter of the main pillar 21 is 0.24 μm in the resonator $51_1$, 0.28 μm in the resonator $51_2$, 0.30 μm in the resonator $51_3$ and 0.34 μM in the resonator $51_4$. These main pillars 21 are each located at a position spaced five times the lattice spacing a away from the center of the waveguide $5_0$ widthwise thereof as depicted in FIG. 5.

Figure 4A:
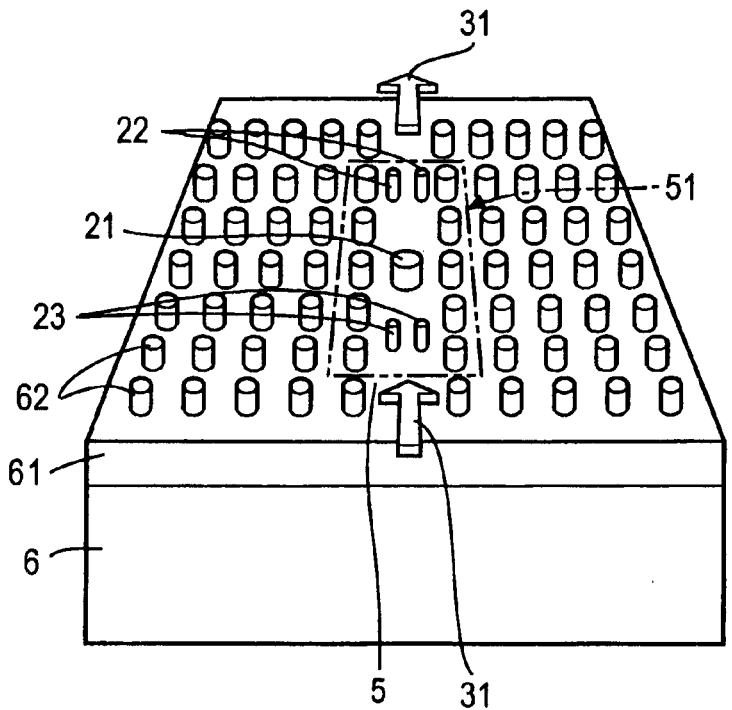
FIG. 4A is a perspective view schematically illustrating a basic structure of a two-dimensional photonic device according to a first embodiment of the present invention.
Figure 4B:
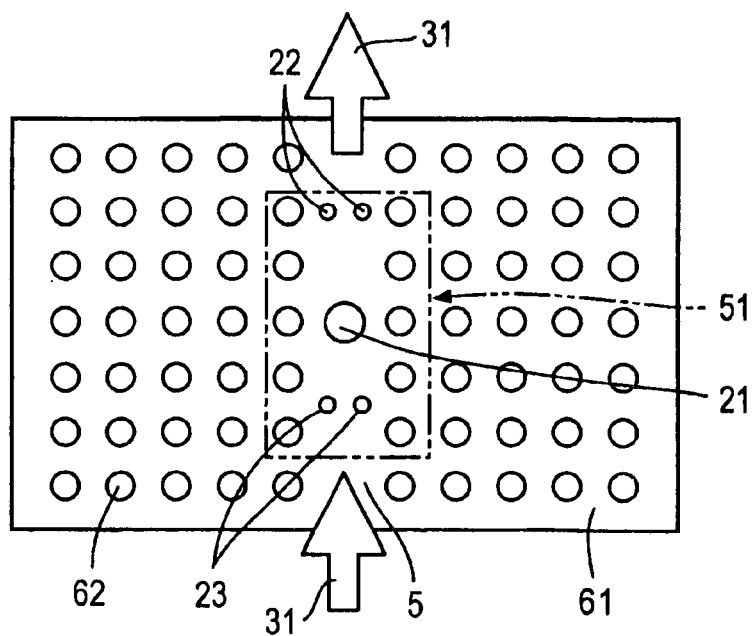
FIG. 4B is a plan view of the FIG. 4A device structure.

The sub-pillars 22 and 23 are disposed in pairs at both sides of the main pillar 21 in the resonators $51_1$ and $51_2$ as in the case of the resonator 5 shown in FIGS. 4A and 4B. Accordingly, the resonators $51_1$ and $51_2$ have a total of five pillars in the waveguides $5_1$ and $5_2$, respectively. On the other hand, in the resonators $51_3$ and $51_4$ another sub-pillar 24 is located further to the inside than the two sub-pillars 23; hence, these resonators $51_3$ and $51_4$ have a total of six pillars in the waveguides $5_3$ and $5_4$, respectively.

The diameters of the sub-pillars, 22, 23 and 24 are all 0.1 μl, and the spacing between the two sub-pillars 22 and the spacing between the two sub-pillars 23 are both 0.2 μm. The two sub-pillars 23 are both spaced 0.7 μm away from the main pillar 21, which in turn is spaced 0.9 μm away from either of the two sub-pillars 22. Incidentally, the sub-pillar 24 is located on the line passing through the center of the main pillar 21 in the direction of incidence of light, and is spaced 0.55 μm away from the main pillar 21.

With the resonators $51_1$, $51_2$, $51_3$ and $51_4$ configured as described above, light of wavelengths in the range of from 1.15 to 1.80 μm launched into the inlet waveguide $5_0$ were transmitted in channels 1 to 4 as shown in FIG. 7. In channel 1 light of a wavelength of 1.306 μm is transmitted through the resonator $51_1$, and in channels 2, 3 and 4 light of wavelengths 1.390 μm, 1.452 μm and 1.587 μm is transmitted through the resonators $51_2$, $51_3$ and $51_4$, respectively. As depicted in FIG. 7, the transmitted light of these four wavelengths has very sharp peaks. In FIG. 7 the wavelengths and transmittances obtained individually in channels 1 to 4 are shown together.

Table 1 shows transmittances of light of the four wavelengths in channels 1 to 4 obtained when the light was launched into the inlet waveguide $5_0$.

TABLE 1

| Wavelength | 1.306 μm | 1.390 μm | 1.452 μm | 1.587 μm |
| --- | --- | --- | --- | --- |
| Channel 1 | 63% | 2% | <1% | <1% |
| Channel 2 | <1% | 70% | <1% | <1% |
| Channel 3 | <1% | 2% | 100% | <1% |
| Channel 4 | <1% | <1% | <1% | 29% |

Figure 8A:
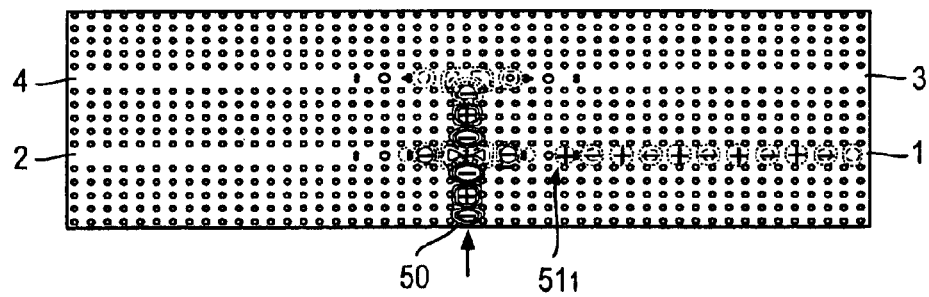
FIG. 8A is a plan view of the FIG. 5 device, showing the electric field distribution developed thereon by the incidence of light of a 1.306-µm wavelength.
Figure 8B:
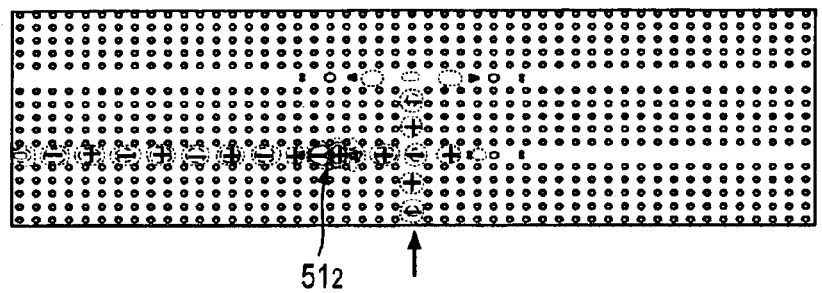
FIG. 8B is a plan view of the FIG. 5 device, showing the electric field distribution developed thereon by the incidence of light of a 1.390-µm wavelength.
Figure 8C:
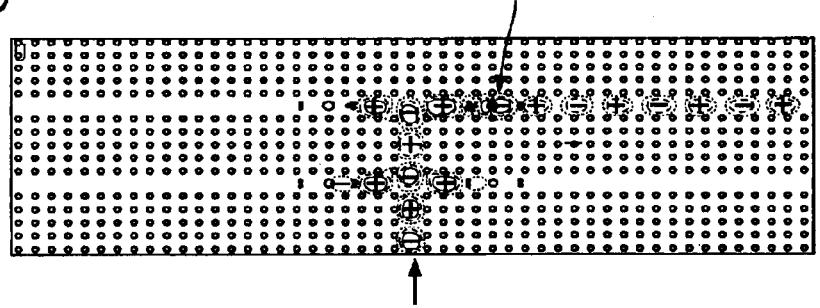
FIG. 8C is a plan view of the FIG. 5 device, showing the electric field distribution developed thereon by the incidence of light of a 1.452-µm wavelength.
Figure 8D:
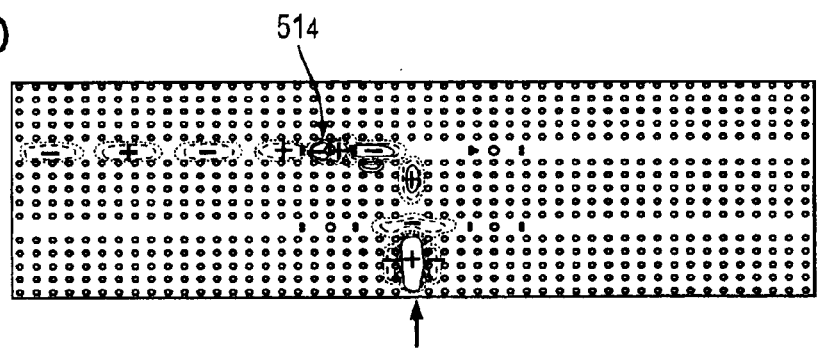
FIG. 8D is a plan view of the FIG. 5 device, showing the electric field distribution developed thereon by the incidence of light of a 1.587-µm wavelength.

FIGS. 8A to 8D show instantaneous electric field distributions developed when light of the four wavelengths of 1.306 μm, 1.390 μm, 1.452 μm and 1.587 μm was launched into the waveguide $5_0$, "+" indicating positive electric fields and "−" indicating negative electric fields. As will be seen from FIG. 8A, the light of the wavelength of 1.306 μm cannot propagate in channels 2, 3 and 4, and it resonates with only the resonator $51_1$ and propagates in channel 1. Similarly, the light of the wavelength of 1.390 μm resonates with only the resonator $51_2$ and propagates in channel 2 as shown in FIG. 8B. The light of the wavelength of 1.452 μm resonates with only the resonator $51_3$ and propagates in channel 3 as depicted in FIG. 8C. The light of the wavelength of 1.587 µm resonates with only the resonator $51_4$ and propagates in channel 4 as depicted in FIG. 8D.

Thus, the two-dimensional photonic crystal device can demultiplex incident wavelength-multiplexed light into light of individual four wavelengths.

Figure 9:
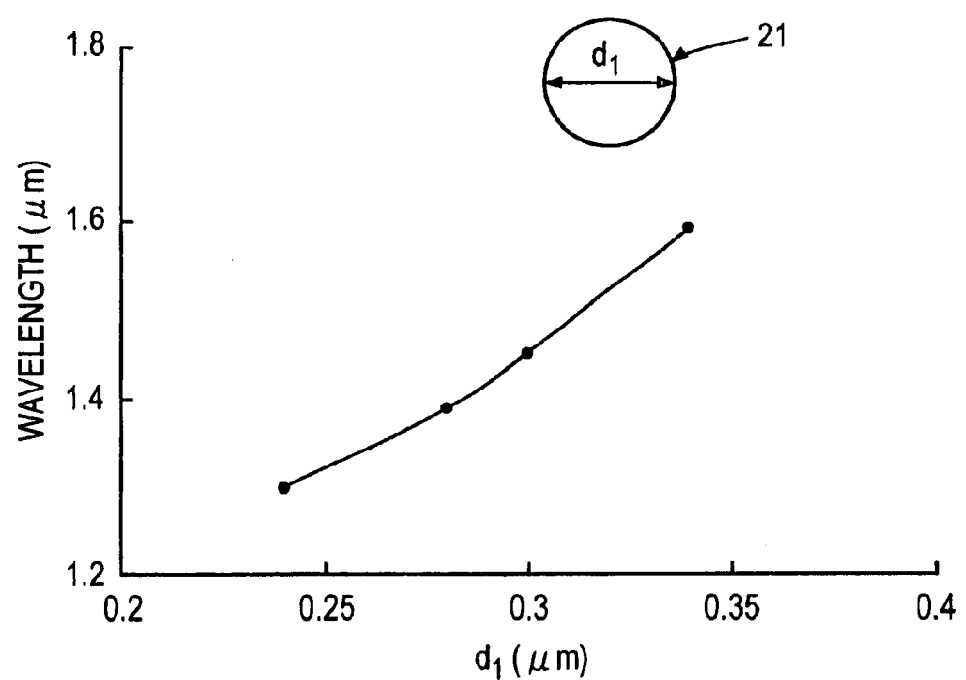
FIG. 9 is a graph showing the relationship between the diameter of a main pillar 21 of the resonator and the wavelength of transmitted light therethrough.

FIG. 9 is a graph showing the relationship between the diameter $d_1$ of the main pillar 21 and the wavelength of transmitted light. It is seen from the graph that the wavelength of transmitted light increases with an increase in the diameter $d_1$.

Now, the role of each of the main pillar 21 and the sub-pillars 22 and 23, which are components of the resonator 51, will be described below based on the results of simulations of one channel.

Figure 10A:
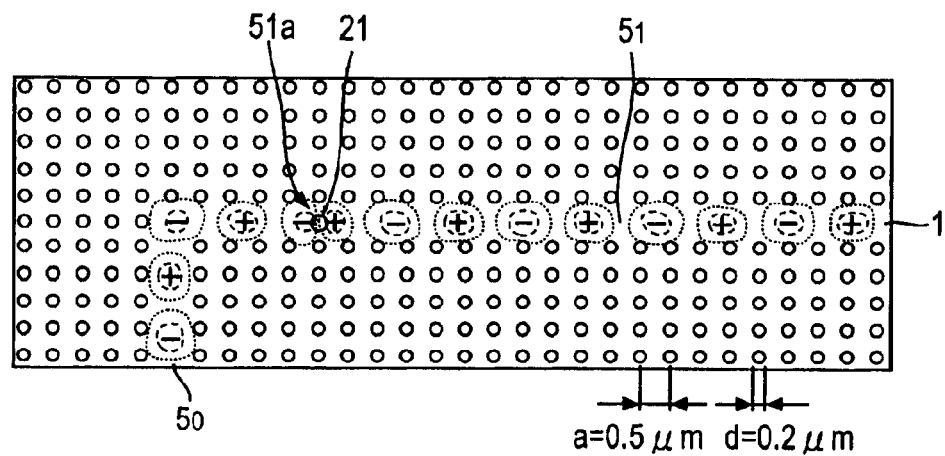
FIG. 10A is a plan view showing a one-channel two-dimensional photonic crystal device having a resonator with only the main pillar 21 disposed in a waveguide and the electric field distribution on the device.
Figure 10B:
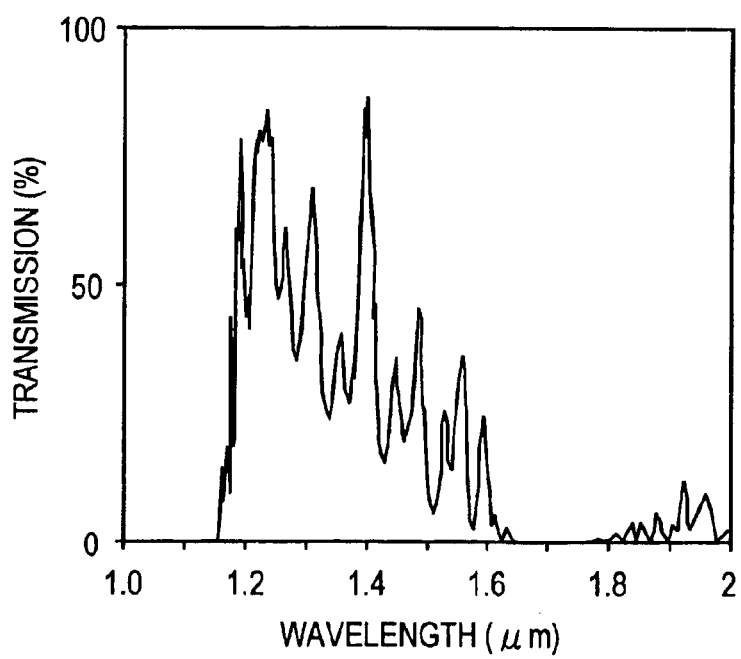
FIG. 10B is a graph showing the wavelength-transmission characteristics of the FIG. 10A device.

FIG. 10A shows a two-dimensional photonic crystal device which was used for simulations of one channel; the device is provided with the waveguide $5_0$ and the waveguide $5_1$ forming channel 1 and a resonator 51a having only the main pillar 21 disposed in the waveguide $5_1$. The simulations of the resonator 51a were done. The diameter of the main pillar 21 was 0.28 µm. FIG. 10A also shows the electric field distribution provided by the incidence of light on the waveguide $5_0$. FIG. 10B shows wavelength-transmission characteristics of light transmitted through the resonator 51a when light of wavelengths in the range from 1.15 to 1.80 µm was launched into the device through the waveguide $5_0$. The light of the 1.4-µm wavelength is higher in transmittance than the light of the other wavelength. But the light is transmitted over a wide range of wavelengths from 1.15 to 1.65 µm, that is, the transmitted light does not exhibit a sharp-peaked transmittance profile but expands over a wide band; hence, the Q-factor of the transmitted light is not so good.

The presence of the main pillar 21 changes the localization of electric fields or their spacing, permitting transmission of light of a particular wavelength. The negative and positive electric fields are partly localized at both sides of the main pillar 21 in the direction lengthwise of the waveguide. This suggests that the main pillar 21 functions to select the wavelength of light to be transmitted.

Figure 11A:
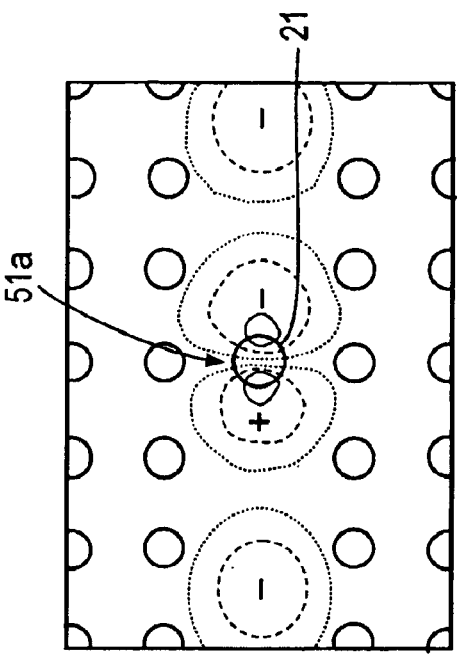
FIG. 11A is an enlarged view of one portion of the FIG. 10A device, showing the electric field distribution developed thereon in the vicinity of the main pillar by the incidence of light of a 1.2-µm wavelength.
Figure 11B:
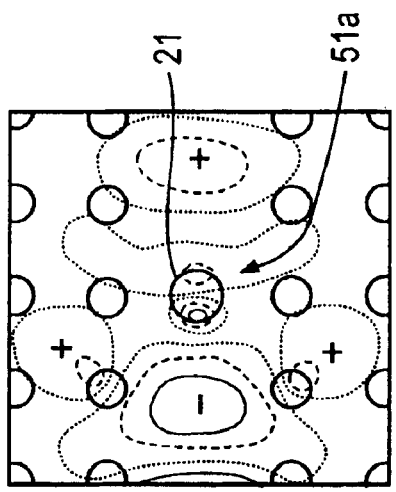
FIG. 11B is an enlarged view of one portion of the FIG. 10A device, showing the electric field distribution developed thereon in the vicinity of the main pillar by the incidence of light of a 1.4-µm wavelength.
Figure 11C:
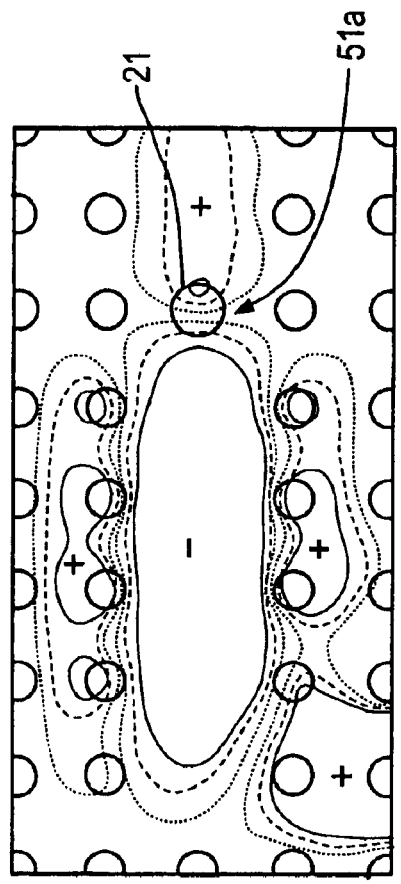
FIG. 11C is an enlarged view of one portion of the FIG. 10A device, showing the electric field distribution developed thereon in the vicinity of the main pillar by the incidence of light of a 1.6-µm wavelength.

FIGS. 11A to 11C are diagrammatic showings of the electric field distributions formed in the resonator 51a of FIG. 10A by the incidence of light of wavelengths of 1.2 µm, 1.4 µm and 1.6 µm, respectively. From FIGS. 11A and 11C it is seen that the electric field distributions are asymmetrical about the resonator 51a, that is, about the main pillar 21 in the cases of the 1.2-µm wavelength and the 1.6-µm wavelength. This asymmetrical distribution of electric fields constitutes an obstacle to the transmission of light of these wavelengths, that is, lowers their transmittance. On the other hand, in the case of the 1.4-µm wavelength shown in FIG. 11B, the electric fields are distributed symmetrically in respect of the main pillar 21, raising the transmittance of light.

The main pillar 21 serves to select the wavelength of light to be transmitted as described above, but the Q-factor of the transmitted light is not high. The Q-factor can be increased by forming optical cavities at both sides of the main pillar 21 in the direction of propagation of light for confinement of electric fields. Such cavities are formed by the sub-pillars 22 and 23 and another sub-pillar 24.

Figure 12A:
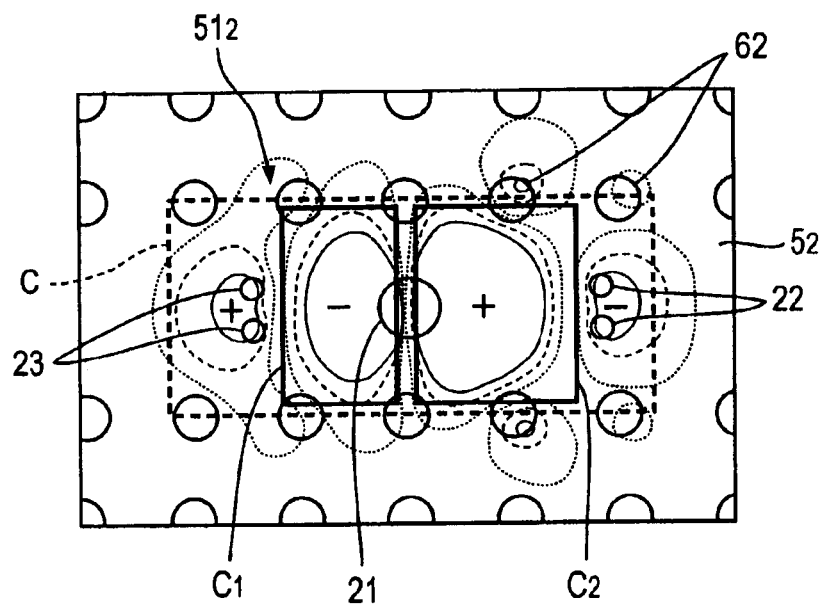
FIG. 12A is an enlarged plan view of one portion of the FIG. 5 device, showing the electric field distribution in the resonator $51_2$ of Channel 2.
Figure 12B:
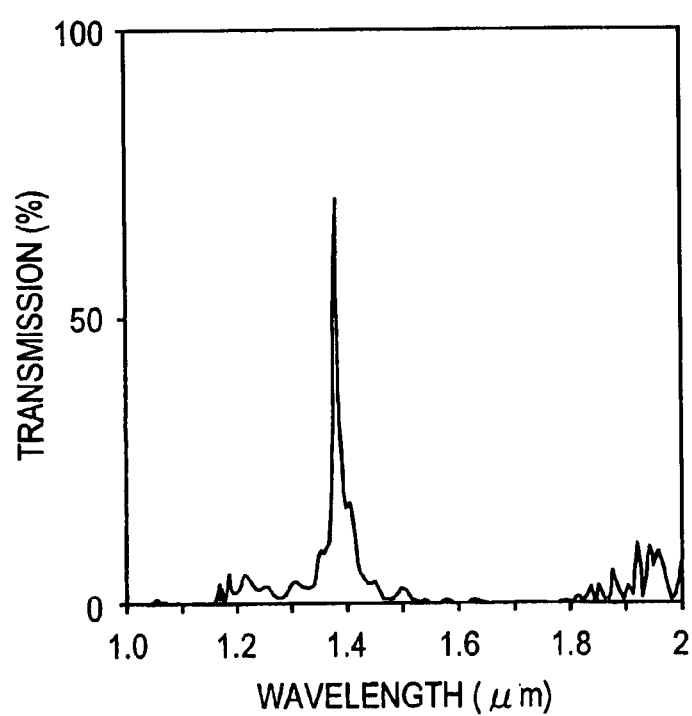
FIG. 12B is a graph showing wavelength-transmission characteristics of the resonator $51_2$ in FIG. 12A.

FIG. 12A is a diagrammatic representation of the electric field distribution formed by the light of the 1.390-µm wavelength in the resonator $51_2$ of channel 2 of the two-dimensional photonic crystal device depicted in FIG. 5. The resonator $51_2$ looks just like a four-sided mirror C as indicated by the thick dotted line. The two sub-pillar 22 delimit a light emitting mirror of the resonator $51_2$, whereas the sub-pillars 23 delimit a light receiving mirror. Those five pillars 62 of the periodic structure forming the photonic crystal which are aligned at either side of the waveguide $5_2$ widthwise thereof delimit mirrors of the resonator $51_2$ at either side widthwise thereof. It can be said that the four-sided mirror C is defined by the two optical cavities $C_1$ and $C_2$ indicated by the thick solid lines. The positive and negative electric fields are confined in the optical cavities $C_1$ and $C_2$ as depicted in FIG. 12A. A high degree of confinement of electric fields occurs when their spatial arrangement coincides with the resonant wavelength—this provides a sharp-peaked transmittance profile, that is, provides increased resonance sharpness. The electric fields are localized in the vicinities of the main pillar 21 and the sub-pillars 22 and 23. The resonator $51_2$ reflects light of non-resonant wavelengths, and the two cavities $C_1$ and $C_2$ confine therein only light of the resonant wavelength. Accordingly, the resonator $51_2$ transmits light of the 1.390-µm wavelength with a Q-factor as high as 300 or so. FIG. 12B is a graph showing the wavelength-transmission characteristics obtained for light of wavelengths of 1.15 to 1.80 µm launched into the waveguide $51_2$.

Figure 13A:
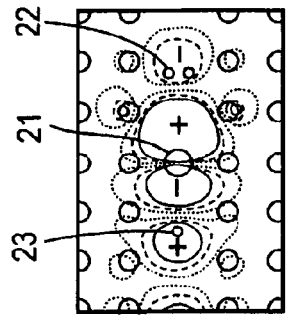
FIG. 13A is an enlarged view showing the electric field distribution in a modified form of the resonator depicted in FIG. 12A.
Figure 14A:
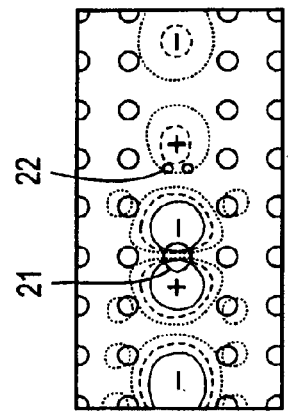
FIG. 14A is an enlarged view showing the electric field distribution in another modified form of the resonator depicted in FIG. 12A.
Figure 15A:
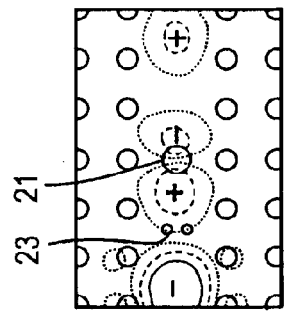
FIG. 15A is an enlarged view showing the electric field distribution in still another modified form of the resonator depicted in FIG. 12A.
Figure 13B:
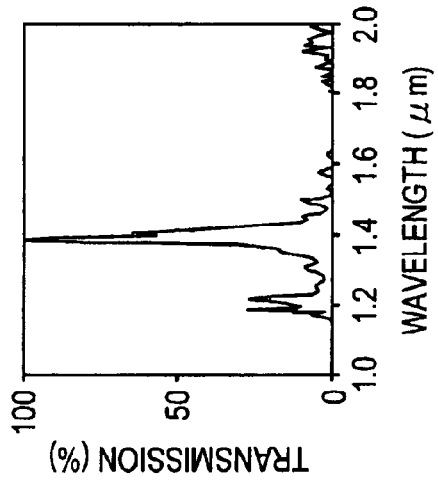
FIG. 13B is a graph showing wavelength-transmission characteristics of the resonator of FIG. 13A.
Figure 14B:
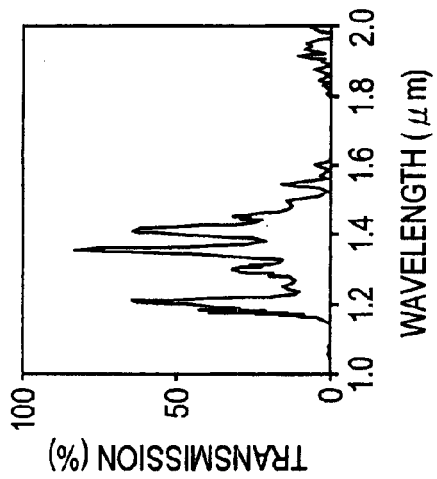
FIG. 14B is a graph showing wavelength-transmission characteristics of the resonator of FIG. 14A.
Figure 15B:
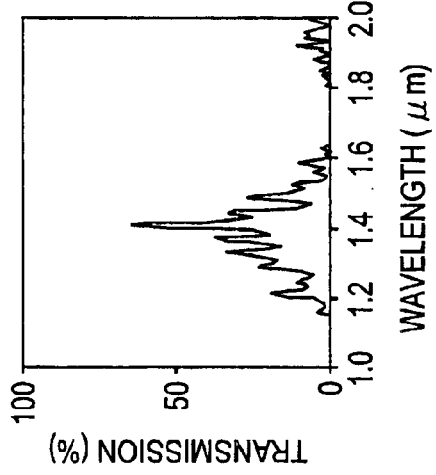
FIG. 15B is a graph showing wavelength-transmission characteristics of the resonator of FIG. 15A.

FIGS. 13A and 13B show the electric field distribution and the wavelength-transmission characteristics obtained with the resonator $51_2$ without the two sub-pillars 22 disposed therein. FIGS. 14A and 14B show the electric field distribution and the wavelength-transmission characteristics obtained with the resonator $51_2$ without the two sub-pillars 23 disposed therein. FIGS. 15A and 15B show the electric field distribution and the wavelength-transmission characteristics obtained with the resonator $51_2$ wherein only one of the sub-pillars 23 is not disposed but the other sub-pillar 23 is located at the center of the waveguide widthwise thereof. In FIGS. 13B and 14B the transmittance profile is wide, indicating the transmission of light over a wide band. In FIG. 15B the transmittance profile has an appreciably sharp peak.

FIG. 16A illustrates a two-dimensional photonic crystal device which has the waveguide $5_0$ and the waveguide $5_1$ of channel 1 as is the case with the FIG. 10A device structure and in which a resonator $51_5$ composed of the main pillar 21 and two pairs of sub-pillars 22 and 23 is disposed in the waveguide $5_1$. The diameter of the main pillar 21 is 0.32 µm. FIG. 16B shows the wavelength-transmission characteristics of the resonator $51_5$ of channel 1 obtained when light of the wavelengths ranging from 1.15 to 1.80 µm was launched into the inlet waveguide $5_0$; in this case, light of the 1.530-µm wavelength was transmitted through the resonator $51_5$. In FIG. 16A there is shown the electric field distribution by the incidence of light of the 1.530-µm wavelength on the inlet waveguide $5_0$.

FIG. 17A shows the electric field distribution resulting from the incidence of light of the 1.530-µm wavelength in the waveguide $5_1$ of a width narrowed from 1 µm to 0.8 µm. FIG. 17B shows the wavelength-transmission characteristics obtained in this case. FIGS. 17A and 17B indicate that when the width of the waveguide $5_1$ is narrowed down to 0.8 µm, light of wavelengths from 1.15 to 1.80 µm cannot propagate through the waveguide $5_1$.

FIG. 18A shows the electric field distribution resulting from the incidence of light of the 1.530-=m wavelength in the waveguide $5_1$ of an increased width of 1.2 µm. FIG. 18B shows the wavelength-transmission characteristics obtained in this case. From FIGS. 18A and 18B, it can be seen that when the width of the waveguide $5_1$ is widened, light of a wide wavelength range propagates therethrough but the transmittance profile of the light transmitted through a resonator $51_{5b}$ becomes wide, degrading the Q-factor.

In FIGS. 16A, 17A and 18A the two sub-pillars 23 and the main pillar 21 are spaced 0.7 $\mu$m apart and the two sub-pillars 22 and the main pillar 21 are spaced 0.9 $\mu$m apart. That is, these device structures are common in the size of the optical cavities $C_1$ and $C_2$ (see FIG. 12A) in the direction lengthwise of the waveguide but differ in the their size in the direction widthwise of the waveguide, and hence differ in the capacities or volumes of the optical cavities $C_1$ and $C_2$. This indicates that the optical cavities $C_1$ and $C_2$ do not effectively function when their capacities have not preferable values. In other words, the capacities of the optical cavities play an important role in selective transmission of light and in enhancement of the Q-factor of the transmitted light to provide a sharp-peaked transmittance profile.

Next, a description will be given of the relationships between the positions of the main pillar 21 and the sub-pillars 22 and 23 in the lengthwise direction of the waveguide and the transmission characteristics of the resonator $51_2$ disposed in channel 2 in the FIG. 5 embodiment, for instance.

Figure 19A:
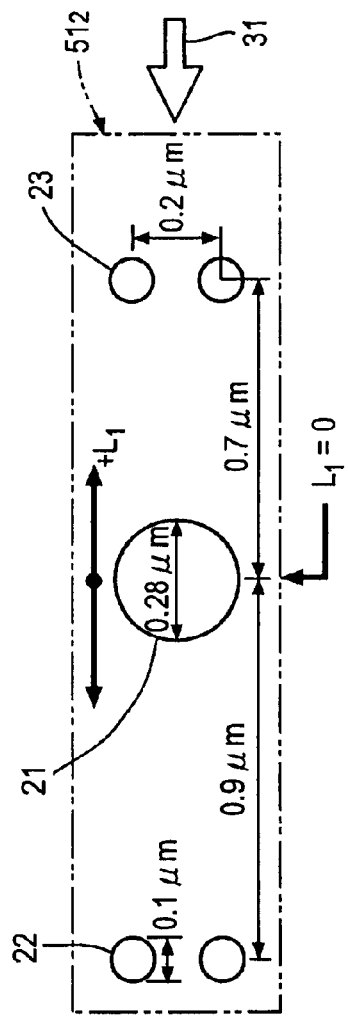
FIG. 19A is a diagram showing the direction in which to shift the position of the main pillar 21 in the resonator $51_2$ depicted in FIG. 6B.
Figure 19B:
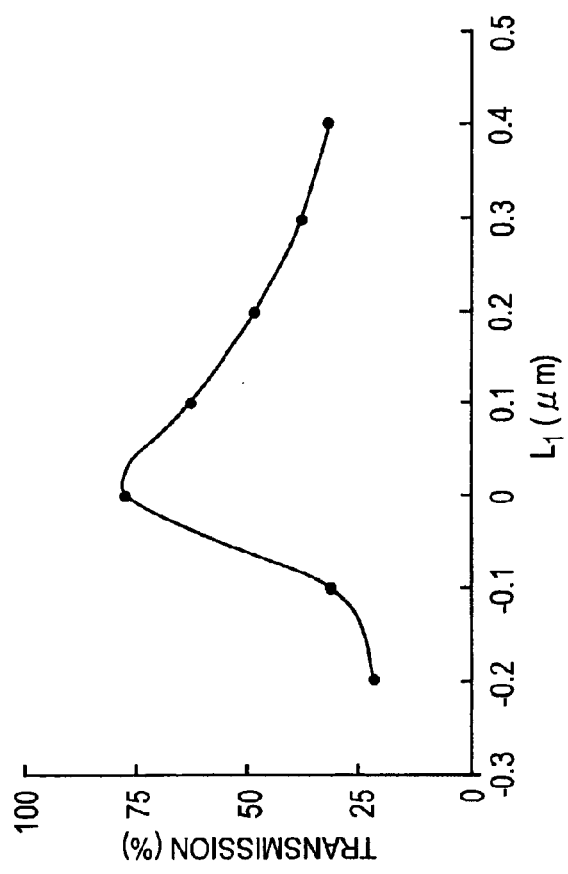
FIG. 19B is a graph showing variations in the transmittance of the resonator $51_2$ with the position of the main pillar 21 shifted as depicted in FIG. 19A.

FIG. 19B is a graph shows variations in the transmittance in the case of changing the position of the main pillar 21 in the lengthwise direction of the waveguide $5_2$ but not changing the positions of the sub-pillars 22 and 23. With the main pillar 21 held at its initial position $L_1=0$ $\mu$m, the transmittance is maximum, and even if the position of the main pillar 21 is changed, reduction of the transmittance is gentle; the transmittance remains high above 25% in the range of $L_1$ from $-0.1$ $\mu$m to 0.4 $\mu$m. Accordingly, high transmittance can be achieved without the need for particularly high accuracy in the position of the main pillar 21 between the sub-pillars 22 and 23 in the lengthwise direction of the waveguide. This is one of striking features of the present invention.

Further, that the transmittance can be set at a desired value by selectively positioning the main pillar 21 means implementation of an optical attenuation function by which the ratio of output light to input one can be set as desired. This means simultaneous realization of the wavelength selective filter function and the optical attenuation function, which is another striking feature of the present invention.

FIG. 20B shows variations in the transmittance in the case of shifting the positions of only the two sub-pillars 23 in the lengthwise direction of the waveguide as depicted in FIG. 20A. With the sub-pillars 23 held at their initial position $L_2=0$ $\mu$m, the transmittance is maximum. The position accuracy required for the sub-pillars 23 is higher than in the case of the main pillar 21.

Figure 21A:
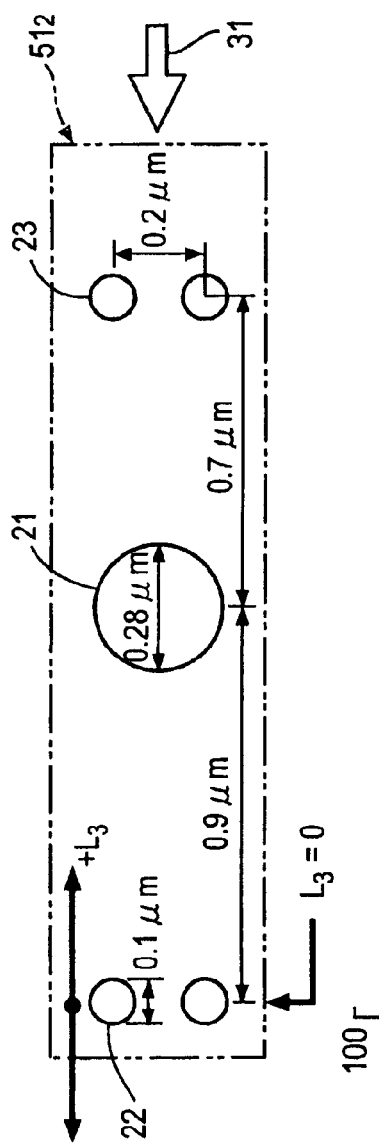
FIG. 21A is a diagram showing the direction in which to shift the positions of the sub-pillars 22 in the resonator $51_2$ depicted in FIG. 19A.
Figure 21B:
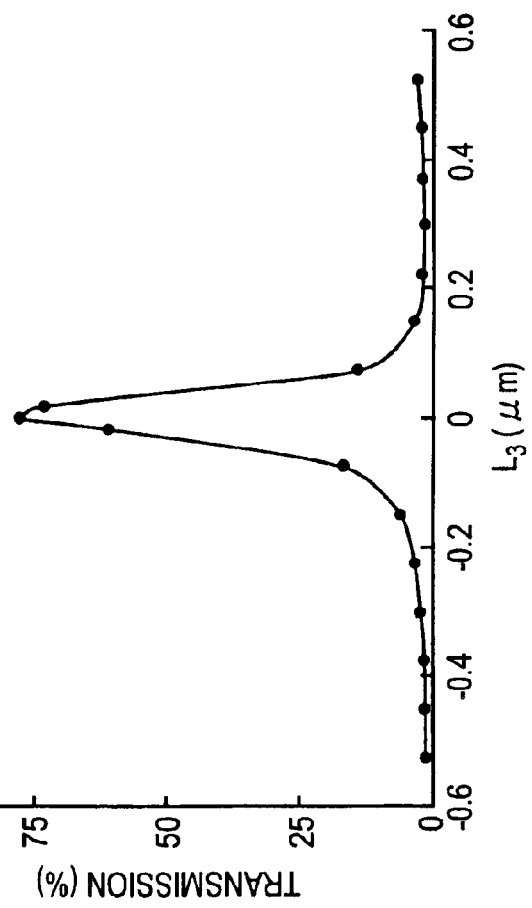
FIG. 21B is a graph showing variations in the transmittance of the resonator $51_2$ with the positions of the sub-pillars 22 shifted as depicted in FIG. 21A.

FIG. 21B shows variations in the transmittance in the case of shifting the positions of only the two sub-pillars 22 in the lengthwise direction of the waveguide as depicted in FIG. 21A. With the sub-pillars 22 at their initial position $L_3=0$ $\mu$m, the transmittance is maximum. The position accuracy required for the sub-pillars 22 is high as is the case with the sub-pillars 23.

Figure 22A:
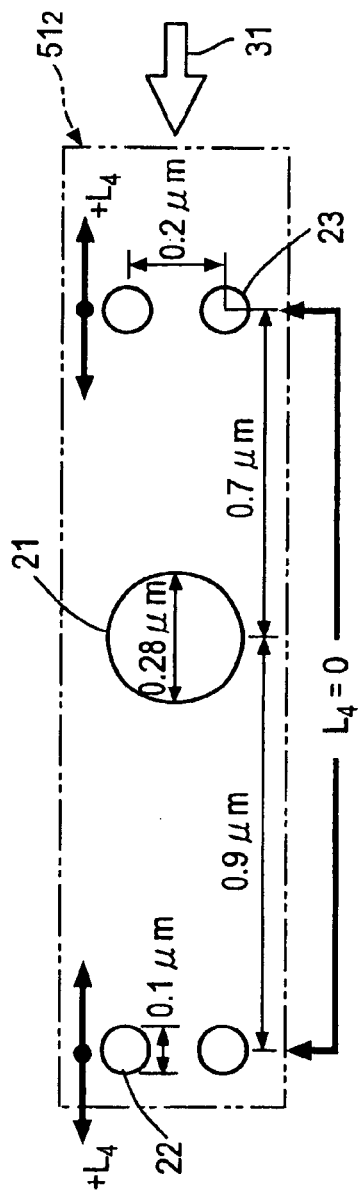
FIG. 22A is a diagram showing the directions in which to simultaneously shift the positions of the sub-pillars 22 and 23 and in the resonator $51_2$ depicted in FIG. 19A.
Figure 22B:
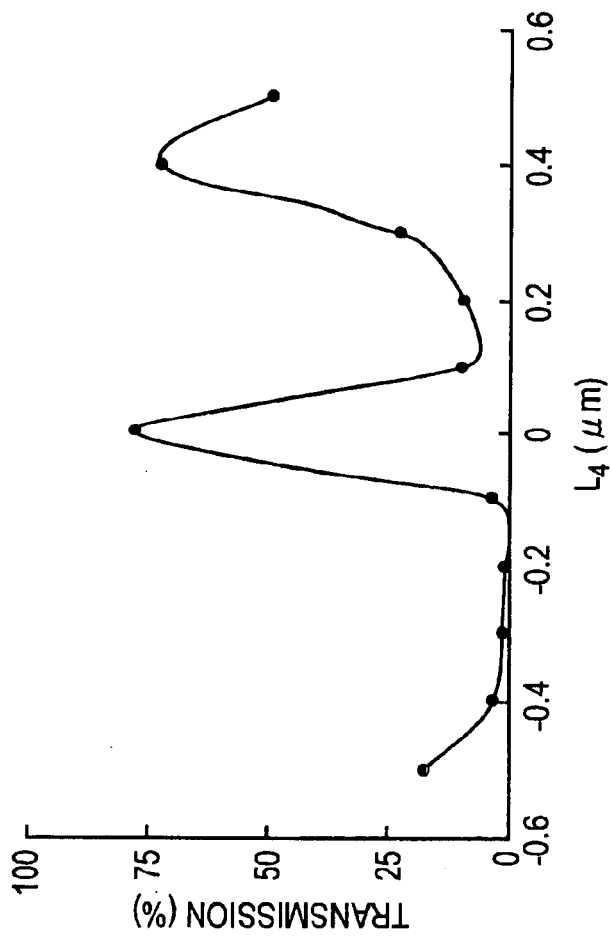
FIG. 22B is a graph showing variations in the transmittance of the resonator $51_2$ with the positions of the sub-pillar 22 and 23 shifted as depicted in FIG. 22A.

FIG. 22B shows variations in the transmittance in the case of shifting the positions of the two pairs of sub-pillars 22 and 23 in the direction away from or toward each other lengthwise of the waveguide with the main pillar 21 as depicted in FIG. 22A. As shown in FIG. 22B, the transmittance is maximum with the sub-pillars 22 and 23 at their initial position $L_4=0$ $\mu$m, and the transmittance is also high with $L_4=0.4$ $\mu$m; however, when the sub-pillars are positioned with $L_4=0.4$ $\mu$m, transmitted light expands over a wide wavelength band and hence is of low Q-factor.

Figure 6:
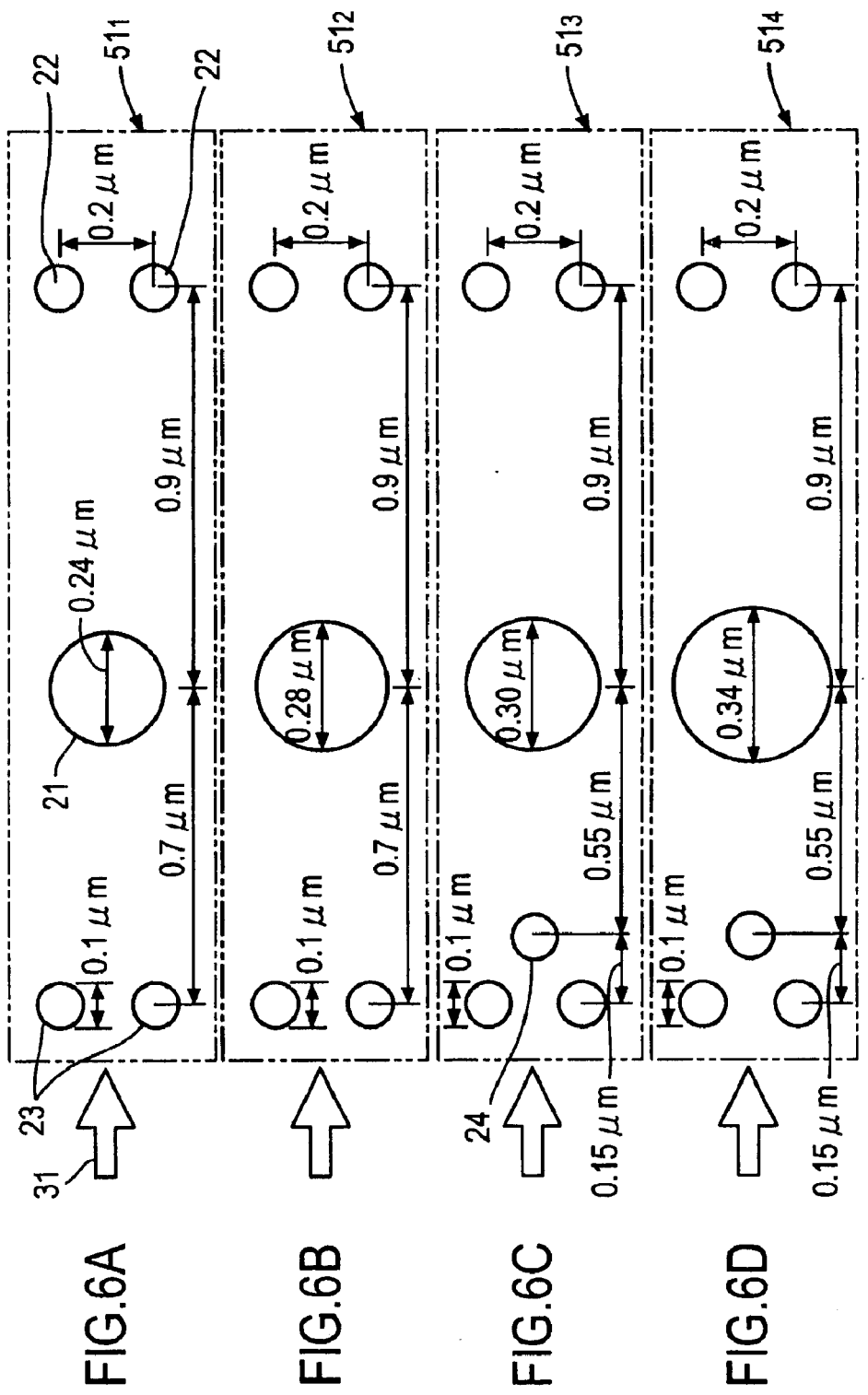
FIG. 6A is an enlarged plan view showing the configuration of a principal part of a resonator $51_1$ of channel 1 in FIG. 5.
FIG. 6B is an enlarged plan view showing the configuration of a principal part of a resonator $51_2$ of channel 2 in FIG. 5.
FIG. 6C is an enlarged plan view showing the configuration of a principal part of a resonator $51_3$ of channel 3 in FIG. 5.
FIG. 6D is an enlarged plan view showing the configuration of a principal part of a resonator $51_4$ of channel 4 in FIG. 5.
Figure 7:
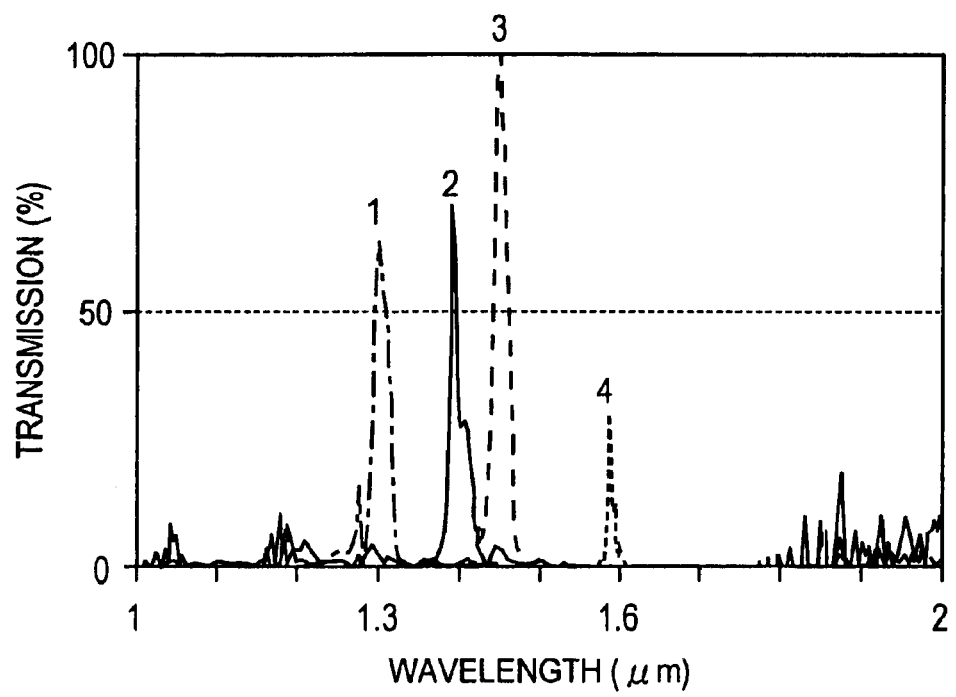
FIG. 7 is a graph showing wavelength-transmission characteristics of channels 1 to 4 of the FIG. 5 device, respectively.

Next, based on the results of simulation of channel 4, a description will be given of the reason for which the additional sub-pillar 24 is disposed at the light incident side in the resonators $51_3$ and $51_4$ of channels 3 and 4 as depicted in FIGS. 6C and 6D.

The transmittance of light of the 1.587 $\mu$m in channel 4 is 29% as given in Table 1. In the absence of the sub-pillar 24, the transmittance goes down to as low as 4%. In channels 1 and 2 where the sub-pillar 24 is not used, however, the transmittance is as high as 63% and 70% as shown in Table 1.

This demonstrates that the sub-pillar 24 is not required in channels 1 and 2 branched first from the inlet waveguide $5_0$ intermediately thereof but that the provision of the sub-pillar 24 is important in channels 3 and 4 branched from the inner end of the inlet waveguide $5_0$. Accordingly, the provision of the sub-pillar 24 is a contributing factor for increasing the number of channels to be accommodated and keeping high light transmittance.

As described above, since five or six resonant pillars such as the main pillar 21 and the sub-pillars, 22, 23 and 24 constituting the resonator 51 are formed of the same medium as that of the pillars 62 forming the periodic structure of the two-dimensional photonic crystal, the device of the present invention can be constructed from only two media forming the photonic crystal and hence is very easy to manufacture unlike the device of document 2 or 3 in which the point defect (pillar) for resonance is formed of a medium different in refractive index from the pillars of the periodic structure.

Furthermore, the manufacture of the device structure set forth in document 1 is difficult because the wall between the point defect 14 formed by a columnar pillar and the neighboring pillars 16 of the periodic structure is as thin as 0.06 $\mu$m, for example, when the wavelength of propagating light is 1.55 $\mu$m. In this embodiment, however, the spacing between adjacent pillars is at least 0.1 $\mu$m, that is, the air layer is at least 0.1 $\mu$m thick—this allows much ease in the fabrication of the device of this embodiment accordingly. Moreover, the center wavelength of transmitted light is basically dependent on the diameter of the main pillar 21, and in this embodiment the main pillar 21 is surrounded with enough space to permit selection of its diameter over a wide range, making it possible to demultiplex light of a wide wavelength range into plural, for example, four channels.

Additionally, the device of document 1 has the structure in which the light 13 is launched into the slab 11 through the end face of the waveguide in an in-plane direction and the light 15 captured by the point defect 14 is emitted in the direction perpendicular to the slab surface, but this device structure makes difficult the location of a device for receiving the emitted light, for instance, and hence is awkward to handle in this respect. In contrast thereto, the device of this embodiment light is configured so that light launched into and emitted from the device in the same plane, and hence the device is much easier to handle.

Incidentally, by constituting the resonator 51 by five resonant pillars, that is, the main pillar 21 and the two pairs of sub-pillars 22 and 23, or six resonant pillars including the sub-pillar 24 as in channels 3 and 4 in FIG. 5, it is possible to provide a sharp-peaked transmittance profile of light wavelength and hence achieve a high Q-factor. The number of resonant pillars is not limited specifically to five or six. According to its usage, the two-dimensional photonic crystal device may also be configured with the main pillar 21 alone disposed in the waveguide 5. It is also possible to dispose three or four pillars in the waveguide 5 as depicted in FIGS. 13A, 14A and 15A.

Embodiment 2

Figure 23A:
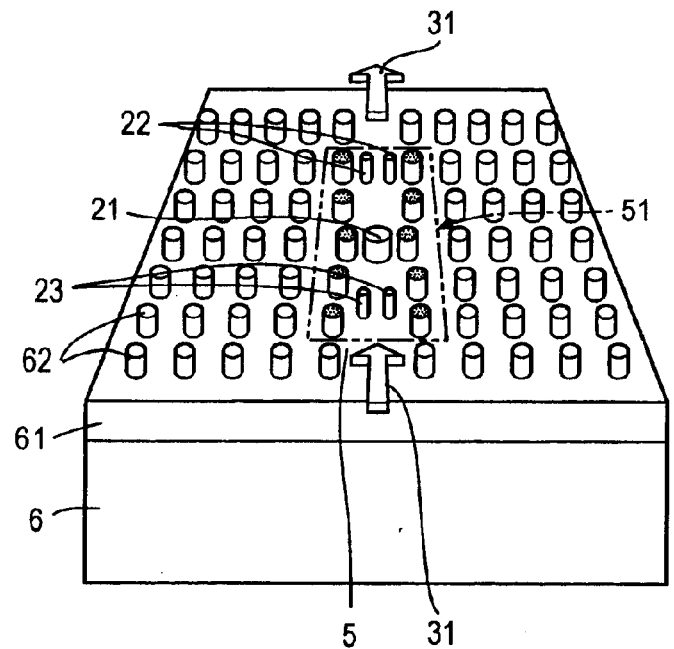
FIG. 23A is a perspective view schematically illustrating a basic structure of a second embodiment of the present invention.
Figure 23B:
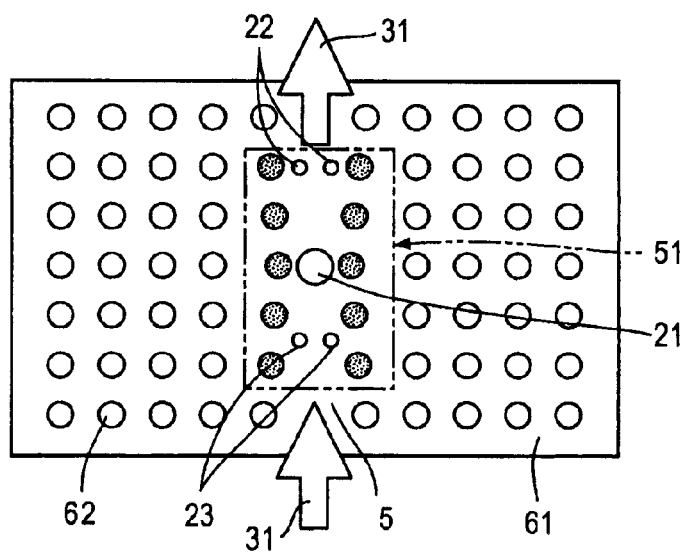
FIG. 23B is a plan view of the device structure shown in FIG. 23A.

In this embodiment the width of the line waveguide is locally narrowed to obtain a high Q-factor and enhance the resonator performance, thereby implementing excellent wavelength selective characteristics. FIGS. 23A and 23B illustrate a basic structure of the two-dimensional photonic crystal device according to this embodiment. The parts corresponding to those in FIGS. 4A and 4B are identified by the same reference numerals, and no detailed description will be repeated.

In this embodiment, in the area of the waveguide 5 where to form the resonator 51, the pillars of the periodic structure at both sides of the waveguide 5 widthwise thereof are displaced so that the width of the waveguide 5 is narrowed symmetrically in respect of the center line thereof. The displaced pillars 62 are indicated by dots in FIGS. 23A and 23B. In the illustrated example five pillars 62 which define either side of the waveguide 5 widthwise thereof are displaced. The width of the waveguide 5 is narrowed at maximum at the center of the resonator 51 where the main pillar 21 is located, from which position the width of the waveguide 5 is symmetrically widened toward the light inlet and outlet ports.

The resonator 51 is formed by the main pillar 21 and the two pairs of sub-pillars 22 and 23 disposed in the waveguide 5 of such narrowed width. This structure provides a high Q-factor.

Figure 24:
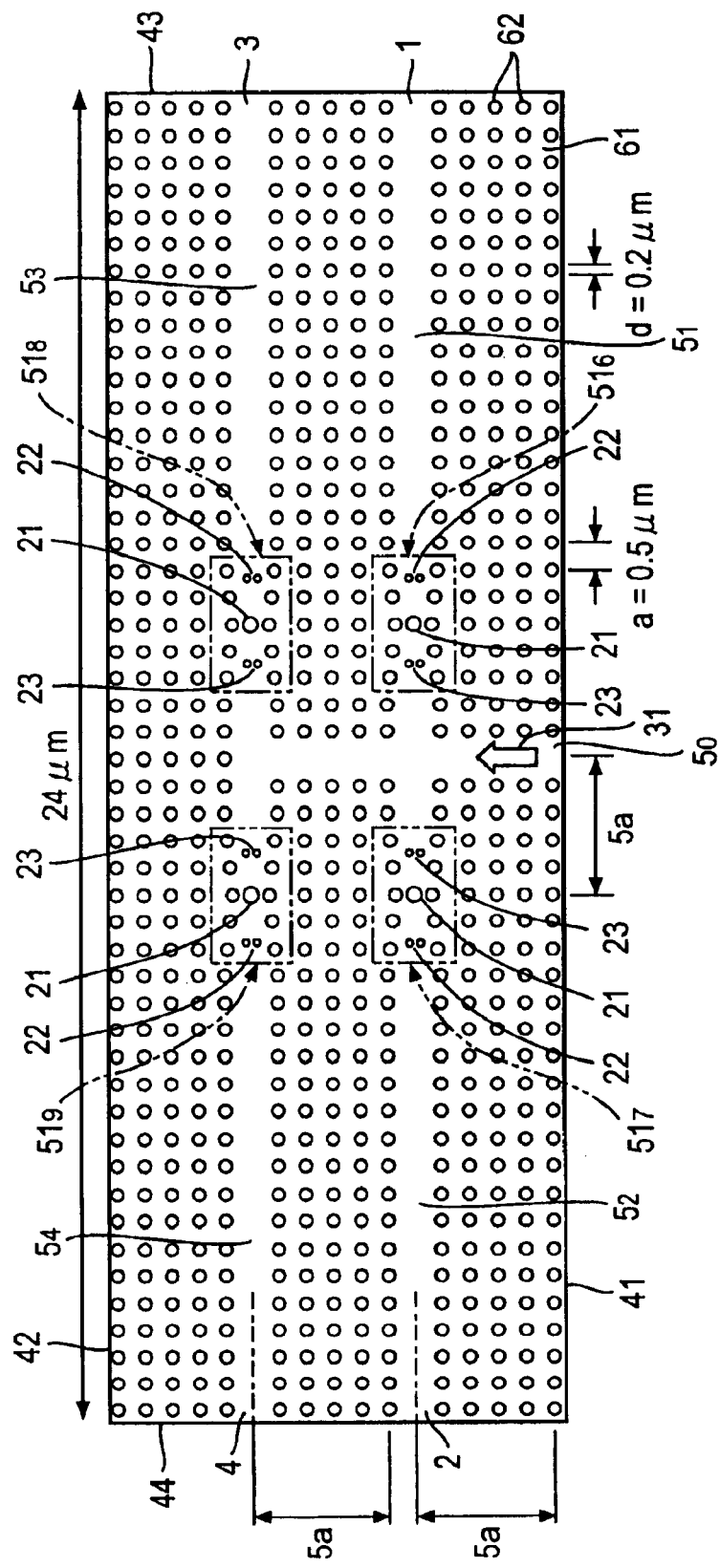
FIG. 24 is plan view illustrating a concrete structure of the second embodiment of the present invention.
Figure 25A:
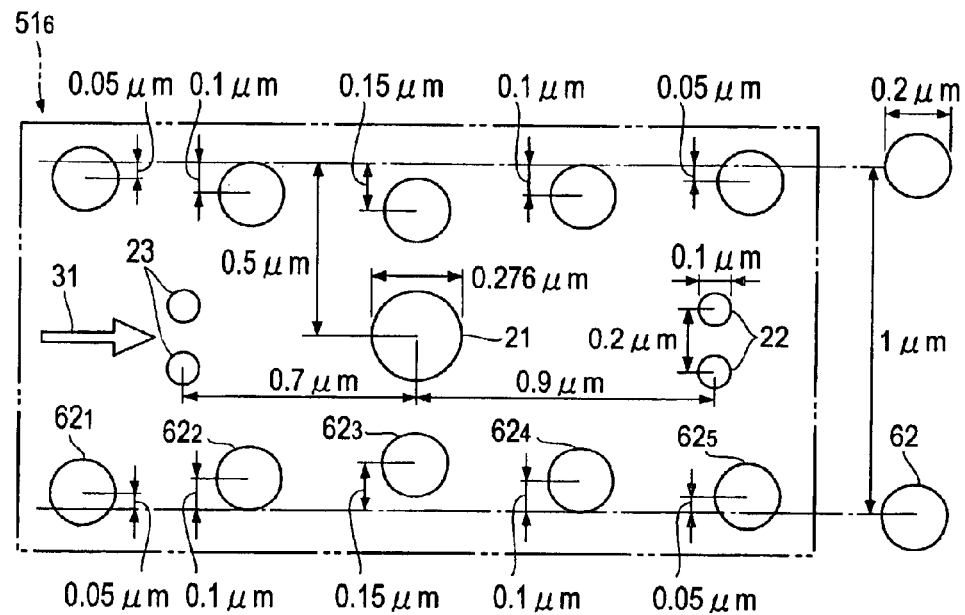
FIG. 25A is an enlarged plan view depicting the configuration of a resonator $51_6$ of channel 1 in the FIG. 24 embodiment.
Figure 25B:
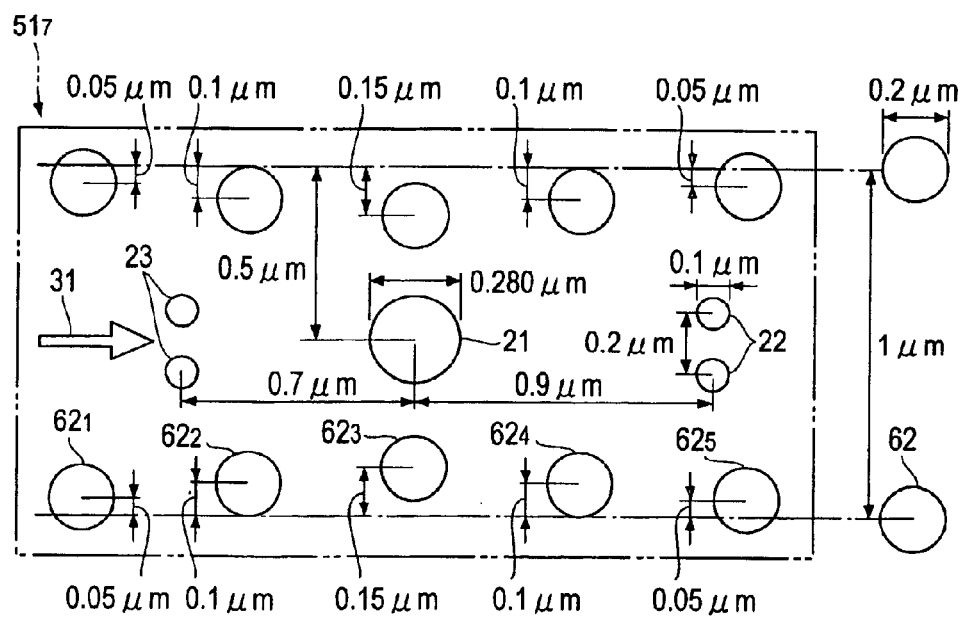
FIG. 25B is an enlarged plan view depicting the configuration of a resonator $51_7$ of channel 2 in the FIG. 24 embodiment.
Figure 25C:
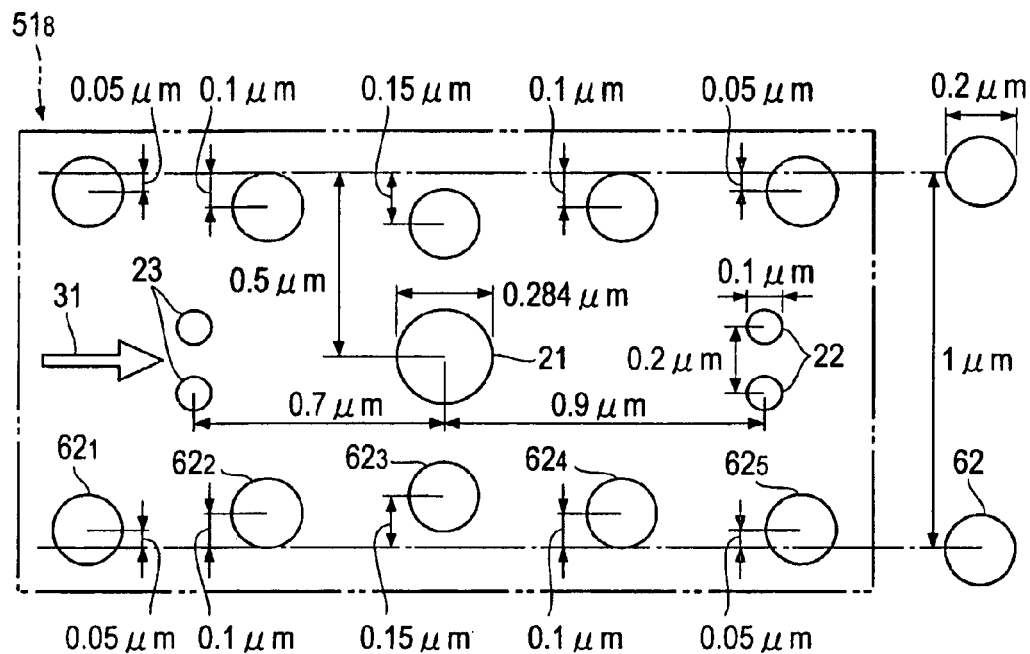
FIG. 25C is an enlarged plan view depicting the configuration of a resonator $51_8$ of channel 3 in the FIG. 24 embodiment.
Figure 25D:
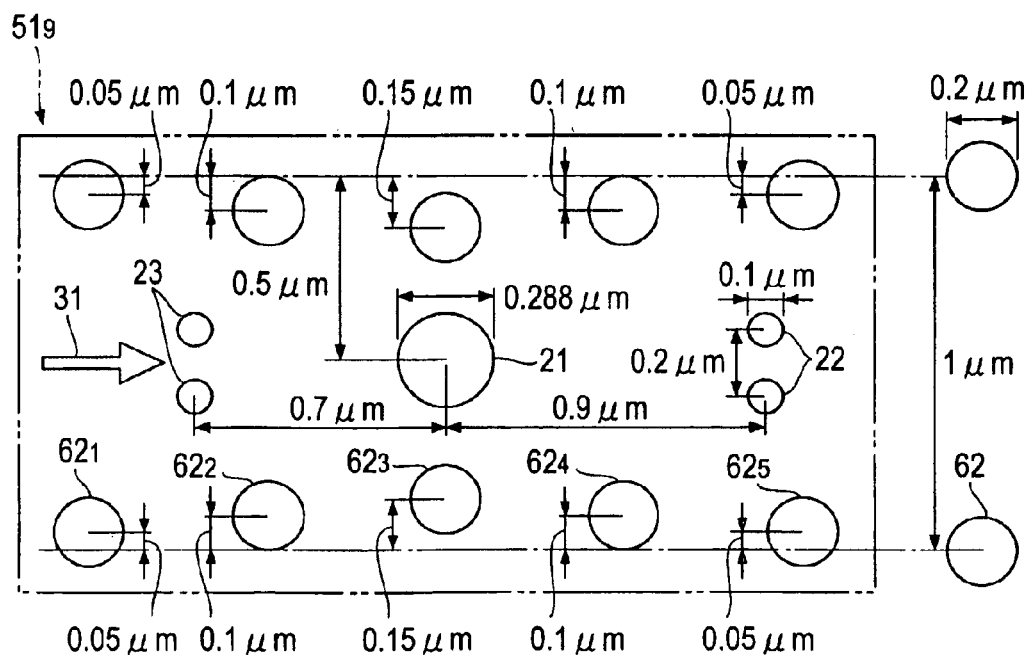
FIG. 25D is an enlarged plan view depicting the configuration of a resonator $51_9$ of channel 4 in the FIG. 24 embodiment.

FIG. 24 illustrates, as a concrete structure of the two-dimensional photonic crystal device having such a resonator configuration, a WDM two-dimensional photonic crystal device that has four channels 1 to 4 and demultiplexes wavelength-multiplexed light into four individual optical signals as is the case with the device of the FIG. 5 embodiment. The parts corresponding to those in FIG. 5 are denoted by similar reference numerals, and no detailed description will be repeated.

A description will be made below of the configurations of resonators $51_6$, $51_7$, $51_8$ and $51_9$ of channels 1 to 4 and light transmission characteristics thereof obtained by simulations.

Referring first to FIGS. 25A to 25D, the configurations of the resonators $51_6$, $51_7$, $51_8$ and $51_9$ will be described. In this embodiment, the diameter of the main pillar 21 is 0.276 $\mu$m in the resonator $51_6$, 0.280 $\mu$m in the resonator $51_7$, 0.284 $\mu$m in the resonator $51_8$, and 0.288 $\mu$m in the resonator $51_9$. The diameters of the sub-pillars 22 and 23 are both 0.1 $\mu$m, and the spacing between the sub-pillars 22 and the spacing between the sub-pillars 23 are both 0.2 $\mu$m. The spacing between either of the two sub-pillars 23 and the main pillar 21 is 0.7 $\mu$m, and the spacing between the main pillar 21 and either of the sub-pillars 22 is 0.9 $\mu$m. In this example, the resonators $51_8$ and $51_9$ of channels 3 and 4 also have the same configuration in which five pillars, i.e. the main pillar 21 and the two pairs of sub-pillars 22 and 23, are disposed in the waveguides $5_3$ and $5_4$.

The five pillars 62 at either side of the waveguide widthwise thereof (which are denoted by $62_1$, $62_2$, $62_3$, $62^4$ and $61_5$ one after another in the direction of propagation of light) are shifted toward the center of the waveguide in its widthwise direction; the shift amounts of the pillars are 0.05 $\mu$m for $62_1$, 0.1 $\mu$m for $62_2$, 0.15 $\mu$m for $62_3$, 0.1 m for $62_4$, 0.05 $\mu$m for $62_5$. In any of the resonators $51_6$, $51_7$, $51_8$ and $51_9$, too, the pillars 62 are staggered as described above.

Figure 26:
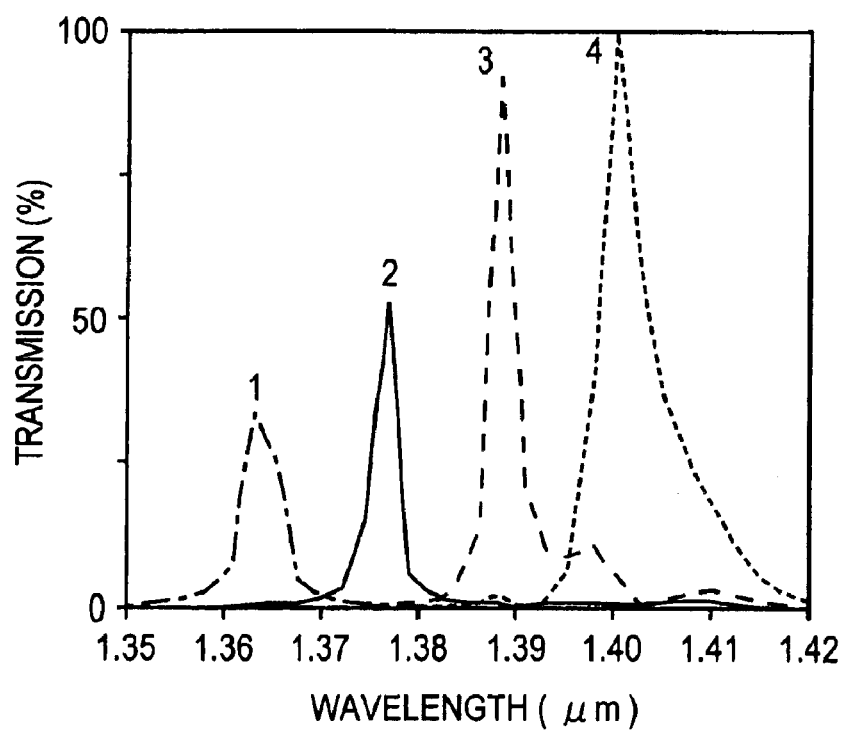
FIG. 26 is a graph showing the wavelength-transmission characteristics of channels 1 to 4 of the FIG. 24 embodiment.

FIG. 26 shows the wavelength-transmittance characteristics in channels 1 to 4 obtained in the case where the resonators $51_6$ to $51_9$ were configured as described above and light was launched into the inlet waveguide $5_0$. In this example light of four wavelengths is transmitted within a narrow range of wavelengths from 1.35 to 1.42 $\mu$m, and the light of each of the four wavelength exhibits a sharp-peaked transmittance profile and the Q-factor is in the range of from 400 to 600.

Figure 27:
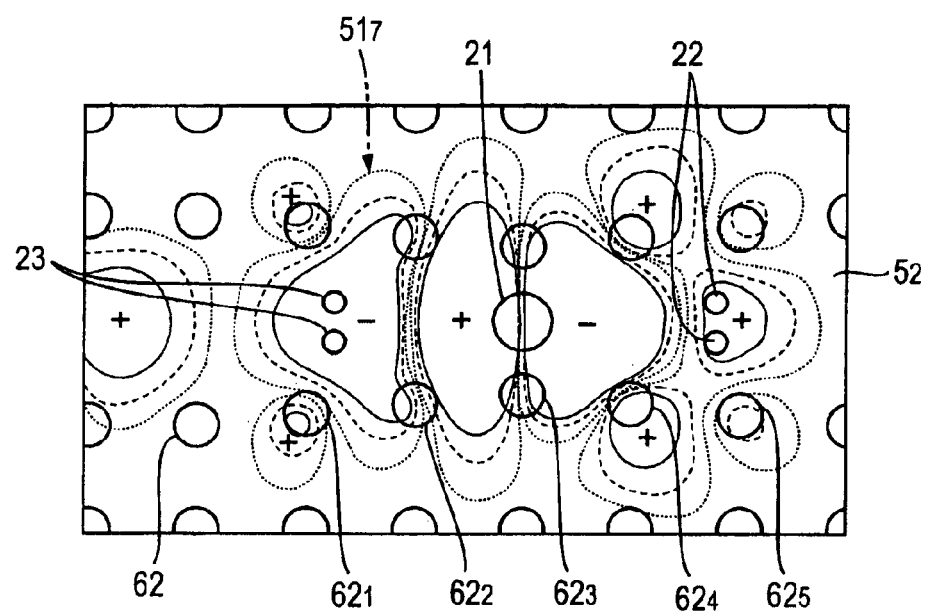
FIG. 27 is an enlarged pan view showing the electric field distribution in the resonator $51_7$ of channel 2 of the FIG. 24 embodiment.

FIG. 27 shows, by way of example, the electric field distribution in the resonator $51_7$ of channel 2 by the incidence of light of a wavelength resonant therewith. It can be seen that the electric field distribution is mostly confined within the resonator $51_7$, that is, localized within the optical cavity, thereby providing increased light confinement performance.

Incidentally, from the diameter of the main pillar 21 in each of channels 1 to 4 shown in FIGS. 25A to 25D and the wavelength-transmission characteristics of transmitted light in the four channels shown in FIG. 26, it was found that a 0.4-nm change in the diameter of the main pillar 21 causes a 1-nm change of the wavelength of transmitted light.

The two-dimensional photonic crystal device described above has such a configuration and dimensions that it can be formed by lithography and etching, for example, electron beam lithography and inductive coupling etching, Incidentally, while the devices of FIGS. 5 and 24 have been described to have four channels, the number of channels may be larger or smaller than that.

Further, while in the above the present invention has been described as being applied to the pillar structure that uses the two-dimensional photonic crystal formed by a periodic arrangement of silicon pillars in air and silicon resonant pillars, it is also possible to replace such a pillar structure with a hole structure in which holes are periodically made in a dielectric material like silicon and holes for resonance are made therein as well.

Although in the above the present invention has been described to use silicon and air as two media, the invention is not limited specifically to them, but the silicon can be substituted with such dielectric materials as indium phosphide (InP) and gallium arsenide (GaAs).

What is claimed is:

1. A two-dimensional photonic device comprising:
    a two-dimensional photonic crystal composed of a first medium layer having a first refractive index and pillars of a second medium having a refractive index different from that of said first medium layer and disposed therein in matrix form;
    a line waveguide formed in said two-dimensional photonic crystal by its crystal defects; and
    resonant pillars of said second medium disposed in said line waveguide, wherein said resonant pillars are a main pillar disposed at the center of said line waveguide in its widthwise direction, a first set of sub-pillars disposed at a light incidence side of said line waveguide with respect to said main pillar, and second set of sub-pillars disposed at a light emitting side of said line waveguide with respect to said main pillar, and wherein said first set of sub-pillars consists of two sub-pillars symmetrically arranged in respect of the center of said line waveguide in its widthwise direction.

2. The two-dimensional photonic crystal device of claim 1, wherein the width of said line waveguide is symmetrically narrowed in respect of its center along the area where said resonant pillars are disposed.

3. A two-dimensional photonic device comprising:
a two-dimensional photonic crystal composed of a first medium layer having a first refractive index and pillars of a second medium having a refractive index different from that of said first medium layer and disposed therein in matrix form;
a line waveguide formed in said two-dimensional photonic crystal by its crystal defects; and
resonant pillars of said second medium disposed in said line waveguide, wherein said resonant pillars are a main pillar disposed at the center of said line waveguide in its widthwise direction, a first set of sub-pillars disposed at a light incidence side of said line waveguide with respect to said main pillar, and second set of sub-pillars disposed at a light emitting side of said line waveguide with respect to said main pillar, and wherein said second set of sub-pillars consists of two sub-pillars symmetrically arranged in respect of the center of said line waveguide in its widthwise direction.

4. The two-dimensional photonic crystal device of claim 3, wherein the width of said line waveguide is symmetrically narrowed in respect of its center along the area where said resonant pillars are disposed.

5. A two-dimensional photonic device comprising:
a two-dimensional photonic crystal composed of a first medium layer having a first refractive index and pillars of a second medium having a refractive index different from that of said first medium layer and disposed therein in matrix form;
a line waveguide formed in said two-dimensional photonic crystal by its crystal defects; and
resonant pillars of said second medium disposed in said line waveguide, wherein said resonant pillars are a main pillar disposed at the center of said line waveguide in its widthwise direction, a first set of sub-pillars disposed at a light incidence side of said line waveguide with respect to said main pillar, and second set of sub-pillars disposed at a light emitting side of said line waveguide with respect to said main pillar, and wherein said first set of sub-pillars consists of three sub-pillars, two of which are symmetrically arranged in respect of the center of said line waveguide in its widthwise direction and the remaining one of which is located closer to said main pillar than said two sub-pillars, said remaining one pillar being disposed at the center of said line waveguide in its widthwise direction.

6. The two-dimensional photonic crystal device of claim 5, wherein the width of said line waveguide is symmetrically narrowed in respect of its center along the area where said resonant pillars are disposed.

7. A two-dimensional photonic crystal device comprising:
a two-dimensional photonic crystal composed of a first medium layer having a first refractive index and pillars of a second medium having a refractive index different from that of said first medium layer and disposed therein in matrix form;
a line waveguide formed in said two-dimensional photonic crystal by its crystal defects; and
resonant pillars of said second medium disposed in said line waveguide, wherein the width of said line waveguide is symmetrically narrowed in respect of its center along the area where said resonant pillars are disposed.

8. The two-dimensional photonic crystal device of claim 7, wherein said resonant pillars are a main pillar disposed at the center of said line waveguide direction, a first set of sub-pillar disposed at a light incidence side of said line waveguide with respect to said main pillar, and second set of sub-pillars disposed at a light emitting side of said line waveguide with respect to said main pillar.

* * * * *